(12) United States Patent
Nishizeki et al.

(10) Patent No.: US 7,360,883 B2
(45) Date of Patent: Apr. 22, 2008

(54) ACTIVE RAY CURABLE INK, IMAGE FORMING METHOD AND INK-JET RECORDING APPARATUS

(75) Inventors: Masato Nishizeki, Hachioji (JP); Kimihiko Ookubo, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 395 days.

(21) Appl. No.: 11/058,804

(22) Filed: Feb. 15, 2005

(65) Prior Publication Data

US 2005/0190252 A1 Sep. 1, 2005

(30) Foreign Application Priority Data

Feb. 27, 2004 (JP) .............................. 2004-053338

(51) Int. Cl.
*G01D 11/00* (2006.01)

(52) U.S. Cl. .................. 347/100; 347/95; 347/102; 523/160

(58) Field of Classification Search ............... 347/100, 347/95, 96, 101, 102; 106/31.6, 31.13, 31.27; 523/160, 161
See application file for complete search history.

(56) References Cited

U.S. PATENT DOCUMENTS

| | | | | |
|---|---|---|---|---|
| 2004/0241578 A1* | 12/2004 | Hirai | | 430/270.1 |
| 2004/0252171 A1* | 12/2004 | Nishizeki et al. | | 347/100 |
| 2005/0119362 A1* | 6/2005 | Ishikawa | | 347/1 |

FOREIGN PATENT DOCUMENTS

| | | | |
|---|---|---|---|
| JP | 06-200204 A | | 7/1994 |
| JP | 08-003493 A | | 1/1996 |
| JP | 2000-504778 A | | 4/2000 |
| JP | 2001-220526 A | | 8/2001 |
| JP | 2002-188025 A | | 7/2002 |
| JP | 2002-317139 A | | 10/2002 |
| JP | 2003-055449 A | | 2/2003 |
| WO | WO 97/31071 A1 | | 8/1997 |

\* cited by examiner

*Primary Examiner*—Manish S. Shah
(74) *Attorney, Agent, or Firm*—Frishauf, Holtz, Goodman & Chick, P.C.

(57) ABSTRACT

An active ray curable ink containing at least two photopolymerization compounds, one of which is an oxetane compound having a specific formula, and the other is an epoxy compound, having an oxirane ring in the molecule.

17 Claims, 2 Drawing Sheets

ACTIVE RAY CURABLE INK, IMAGE FORMING METHOD AND INK-JET RECORDING APPARATUS

FIELD OF THE INVENTION

The present invention relates to an active ray curable composition, particularly, being an active ray curable ink of a low viscosity, and which cures at a high sensitivity as well as forms a coated layer providing excellent adhesion, hardness and flexibility; and an ink-jet ink, an image forming method, and an ink-jet recording apparatus, utilizing the same.

BACKGROUND OF THE INVENTION

Heretofore, curable compositions, which are cured by active energy rays such as ultraviolet rays and electron rays or by common heat, have been employed in practice for various applications of such as paint for plastic, paper, woodwork and inorganic materials; adhesives, printing ink, printed circuit boards and electrical insulation compounds. Over the years, desired have been further improvements in weather resistance and adhesion, with respect to printing ink, paints and adhesives, among other compounds. Further, known is ultraviolet ray curable ink-jet ink which is cured by ultraviolet rays as ink-jet ink employing these techniques. An ink-jet recording method employing the ultraviolet curable ink has become popular with respect to relatively low odor, rapid drying and capability of recording on a recording medium without ink absorption, and disclosed are ultraviolet curable ink-jet inks (please refer, for example, to patent documents 1 and 2). In this application, ink-jet ink is required to have a low viscosity and to form a stronger and more flexible layer. Providing plasticity by addition of a plasticizer in ink-jet inks is disclosed (please refer, for example, to patent document 3). However, this refers only to fusing type ink and there is no description in regard to ultraviolet curable ink-jet ink.

However, in utilizing such inks, there is a problem of the curing sensitivity tending to vary depending on the type of recording materials, and working environment.

Since ink utilizing a radical polymerization compound receives an oxygen inhibition effect, curing inhibition tends to result when an ink droplet volume is small. Further, ink utilizing a cationic polymerization compound (for example, refer to patent documents 4-7) exhibits no oxygen inhibition effect; however, it shows a problem of being easily affected by water content (humidity) at a molecular level.

Patent Document 1: Unexamined Japanese Patent Application Publication No. 6-200204 (hereinafter, referred to as JP-A)

Patent Document 2: Japanese Translation of PCT International Application Publication No. 2000-504778.

Patent Document 3: JP-A No. 8-3493

Patent Document 4: JP-A No. 2001-220526 (scope of claims, and examples)

Patent Document 5: JP-A No. 2002-188025 (scope of claims, and examples)

Patent Document 6: JP-A No. 2002-317139 (scope of claims, and examples)

Patent Document 7: JP-A No. 2003-55449 (scope of claims, and examples)

SUMMARY OF THE INVENTION

This invention has been achieved in response to the above problems, and an object is to provide an active ray curable ink which exhibits low viscosity and high sensitivity, being capable of forming a coated layer provided with enhanced hardness as well as enhanced flexibility under various printing conditions, particularly, under high humidity; ink-jet ink, an image forming method, and an ink-jet recording apparatus, employing the same.

Specifically, this active ray curable ink contains a specific compound having an oxetane ring and an epoxy compound having an oxirane ring in the molecule.

DETAILED DESCRIPTION OF THE INVENTION

Figure 1:
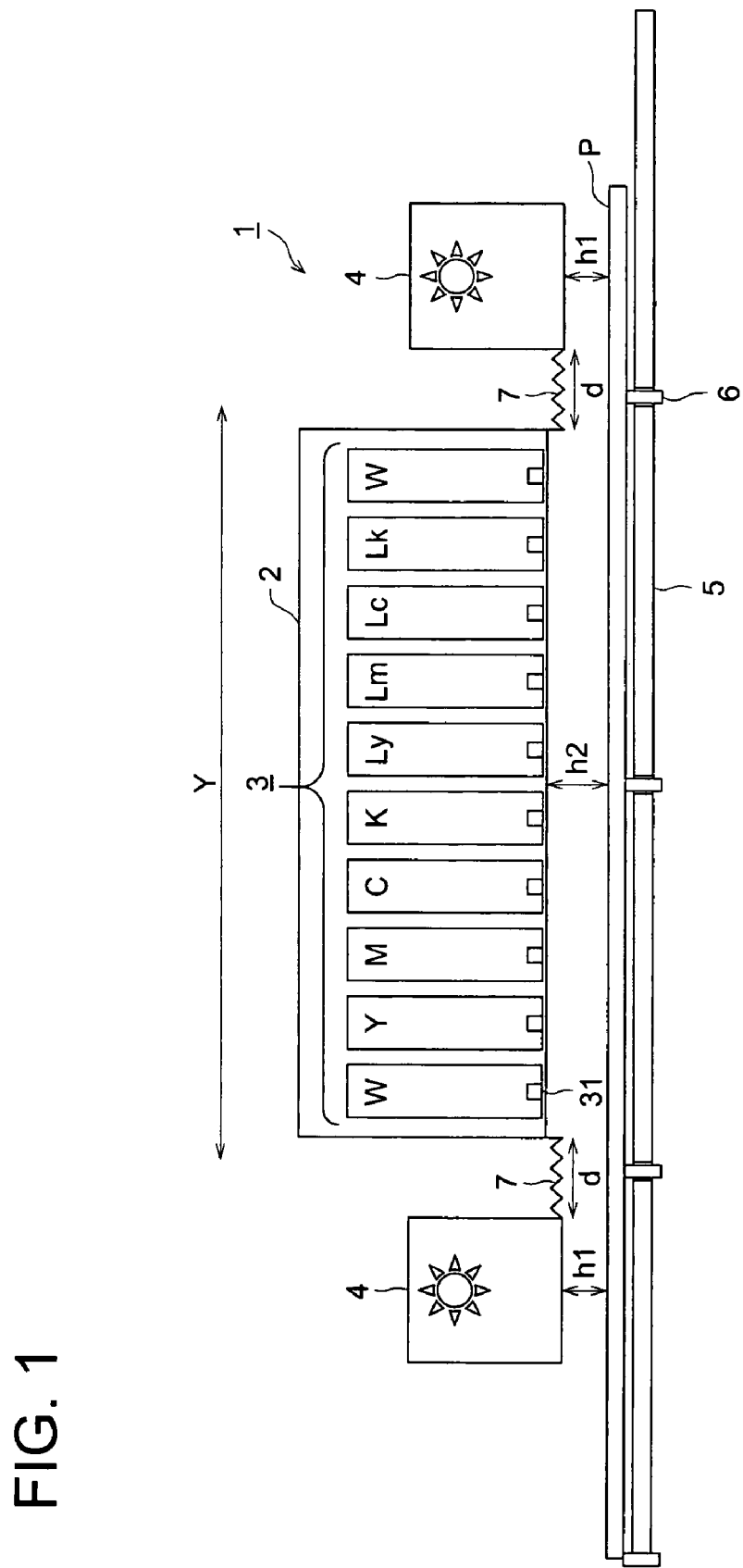
FIG. 1 is a front view drawing showing a primary portion of a recording apparatus of this invention.

The above objects of this invention can be achieved by the following constitutions.

Item 1. An active ray curable ink comprising at least two photo-polymerization compounds, one of which is a compound represented by Formula (A) and an epoxy compound, having an oxirane ring in the molecule:

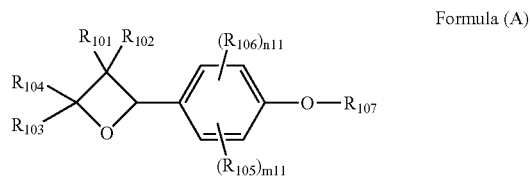

Formula (A)

wherein $R_{101}$, $R_{102}$, $R_{103}$, $R_{104}$, $R_{105}$ and $R_{106}$ each are a substituent, m11 and n11 each are an integer of 0 or 1, $R_{107}$ is a substituted or unsubstituted alkyl group having at least 4 carbon-atoms, provided that the alkyl group is either a straight chain alkyl group, a branched alkyl group or a cyclic alkyl group.

Item 2. The active ray curable ink of Item 1 above, wherein an epoxy compound is represented by Formula (B):

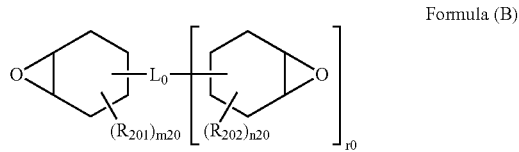

Formula (B)

wherein $R_{201}$ and $R_{202}$ each are a substituent, m20 and n20 each are an integer of 0-2, r0 is an integer of 1-3, $L_0$ is a single bond or a linking group of 1-15 carbon atoms and a valency of r0+1, provided that $L_0$ may contain an oxygen atom or a sulfur atom in the main chain.

Item 3. The active ray curable ink of Item 1 or 2 above, further comprising a compound having an oxetane ring without subsituent at 2-position of the oxetane ring.

Item 4. The active ray curable ink of any one of Items 1-3, wherein $R_{107}$ of Formula (A) is a substituted or unsubstituted alkyl group having at least 7 carbon atoms.

Item 5. The active ray curable ink of any one of Items 1-4, wherein $R_{107}$ of Formula (A) is an alkyl group substituted by an alkoxy group.

Item 6. The active ray curable ink of any one of Items 1-5, wherein an epoxy compound is represented by Formula (I) or (II):

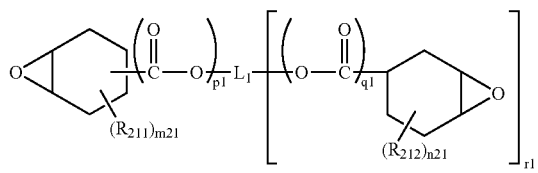

Formula (I)

wherein, $R_{211}$ and $R_{212}$ each are a substituent, m21 and n21 each are an integer of 0-2, p1 and q1 each are an integer of 0 or 1, r1 is an integer of 1-3, and $L_1$ is a single bond or a linking group having 1-15 carbon atoms and a valency of r1+1, provided that $L_1$ may contain an oxygen atom or a sulfur atom in the main chain;

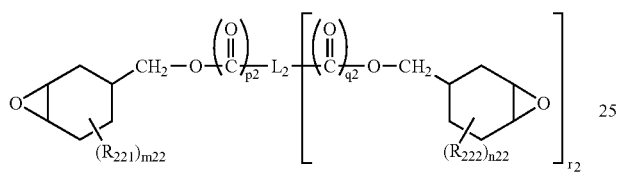

Formula (II)

wherein, $R_{221}$ and $R_{222}$ each are a substituent, m22 and n22 each are an integer of 0-2, p2 and q2 each are an integer of 0 or 1, r2 is an integer of 1-3, and $L_2$ is a single bond or a linking group having 1-15 carbon atoms and a valency of r2+1, provided that $L_2$ may contain an oxygen atom or a sulfur atom in the main chain.

Item 7. The active ray curable ink of any one of Items 1-6, wherein an epoxy compound is represented by Formula (III) or (IV):

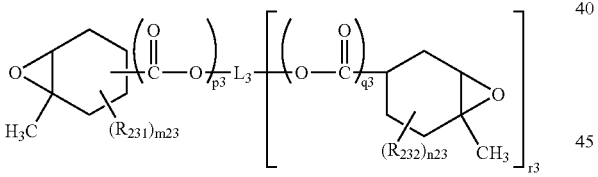

Formula (III)

wherein $R_{231}$ and $R_{232}$ each are a substituent, m23 and n23 each are an integer of 1 or 2, p3 and q3 each are 0 or 1, r3 is an integer of 1-3, and $L_3$ is a single bond or a linking group having 1-15 carbon atoms and a valency of r3+1, provided that $L_3$ may contain an oxygen atom or a sulfur atom in the main chain;

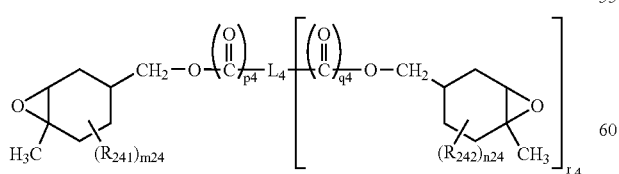

Formula (IV)

wherein $R_{241}$ and $R_{242}$ each are a substituent, m24 and n24 each are an integer of 0 or 1, p4 and q4 each are an integer of 0 or 1, and r4 is an integer of 1-3, in addition $L_4$ is a single bond or a linking group having 1-15 carbon atoms and a valency of r4+1, provided that $L_4$ may contain an oxygen atom or a sulfur atom in the main chain.

Item 8. The active ray curable ink of any one of Items 3-7, wherein the compound having the oxetane ring is a polyfunctional oxetane compound featuring at least two oxetane rings.

Item 9. The active ray curable ink of any one of Items 1-8, further comprising a compound which generates an acid via irradiation upon active rays.

Item 10. The active ray curable of Item 9, wherein a compound which generates an acid via irradiation upon active rays is an onium salt compound.

Item 11. The active ray curable ink of Item 9, wherein a compound which generates an acid via irradiation upon active rays is a sulfonium salt compound.

Item 12. The active ray curable ink of Item 9, wherein a compound which generates an acid via irradiation upon active rays is a sulfonium salt compound represented by Formula (I-1), (I-2) or (I-3):

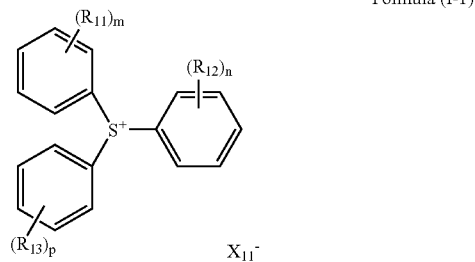

Formula (I-1)

wherein $R_{11}$, $R_{12}$ and $R_{13}$ each are a substituent, m, n and p each are an integer of 0-2, and $X_{11}^-$ is a counter ion;

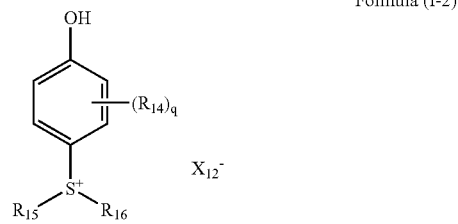

Formula (I-2)

wherein $R_{14}$ is a substituent, q is an integer of 0-2, $R_{15}$ and $R_{16}$ each are a substituted or unsubstituted alkyl group, a substituted or unsubstituted alkenyl group, a substituted or unsubstituted alkynyl group or a substituted or unsubstituted aryl group, while $X_{12}^-$ is a counter ion;

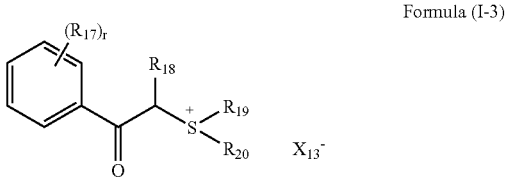

Formula (I-3)

wherein $R_{17}$ is a substituent, r is an integer of 0-3, $R_{18}$ is a hydrogen atom or a substituted or unsubstituted alkyl group, $R_{19}$ and $R_{20}$ each are a substituted or unsubstituted alkyl group, a substituted or unsubstituted alkenyl group, a substituted or unsubstituted alkynyl group or a substituted or unsubstituted aryl group, while $X_{13}^-$ is a counter ion.

Item 13. The active ray curable ink of any one of Items 1-12, wherein the ink has a viscosity of 7-40 mPa·s at 25° C.

Item 14. The active ray curable ink of any one of Items 1-13, wherein the ink contains a pigment.

Item 15. An image forming method comprising the step of:

i) ejecting droplets of the active ray curable ink of any one of Items 1-14 based on image data from a plurality of nozzles of an ink-jet recording head onto a recording material, wherein the active ray curable ink is cured via irradiation upon active rays within 0.001-1.0 second after deposition of the active ray curable ink.

Item 16. The image forming method comprising the step of:

i) ejecting droplets of the active ray curable ink of Item 14, based on image data, from a plurality of nozzles of an ink-jet recording head on a recording material, wherein a volume of the droplets is from 2-15 pl.

Item 17. An ink-jet recording apparatus which is utilized for the image forming method of Item 15 or 16, wherein the ink and the ink-jet head are heated at 35-100° C. prior to ejecting the ink droplets.

Item 18. The ink-jet recording apparatus which is utilized for the image forming method of Item 15 or 16, wherein the ink is ejected onto the recording material, which is heated to 35-60° C.

In the present invention, it is possible to provide active ray curable ink which exhibits low viscosity and high sensitivity as well as forms a very hard and flexible coated layer under various printing conditions, particularly under high humidity, and to provide an ink-jet ink, an image forming method and an ink-jet recording apparatus utilizing the same.

MOST PREFERRED EMBODIMENT OF THE INVENTION

The inventors, as a result of extensive study in response to the above problems, have found that a strong and flexible cured layer can be formed resulting in a high quality image not affected by environmental humidity even with a low illuminance light source, in the case of utilizing ink-jet ink containing an oxetane compound provided with a specific substituent at 2-position of the oxetane ring together with an epoxy compound, which led to this invention.

As a mono-functional oxetane in which 2-position of the oxetane ring is substituted by a benzene ring provided with an electron donating substituent, similar to 2-position substituted oxetane of this invention, 2-(4-methoxy-phenyl)-3,3-dimethyl-oxetane is described in JP-A 2001-191386, however, not mentioned is the benefit that by utilizing this compound in combination with an epoxy compound, nor referred to is formation of a strong and flexible cured coated layer in the case of a combined use of both compounds.

By providing a substituent at 3-position of the 2-position substituted oxetane compound of this invention, compatibility with other polymerization compounds has been enhanced, and physical properties such as safety, hydrophobicity, viscosity, surface tension and other factors have become possible to be suitably designed.

In the ink-jet ink of this invention, it is possible to more improve the reactivity and to enhance the strength of the cured layer by incorporating an alicyclic epoxy compound as an epoxy compound which is utilized together with a 2-position substituted oxetane compound.

In the following paragraphs, this invention will be detailed. Examples of substituent groups represented by $R_{101}$-$R_{106}$ of Formula (A) include halogen atoms (such as a chlorine atom, a bromine atom and a fluorine atom), alkyl groups having 1-6 carbon atoms (such as a methyl group, an ethyl group, a propyl group, an isopropyl group and a butyl group), cycloalkyl groups having 3-6 carbon atoms (such as a cyclopropyl group, a cyclobutyl group, a cyclopentyl group and a cyclohexyl group), alkenyl groups having 1-6 carbon atoms (such as a vinyl group, a 1-propenyl group, a 2-propenyl group and a 2-butenyl group), alkynyl groups having 1-6 carbon atoms (such as an acetylenyl group, a 1-propinyl group, a 2-propinyl group and a 2-butynyl group), alkoxy groups having 1-6 carbon atoms (such as a methoxy group, an ethoxy group, an n-propoxy group, an iso-propoxy group, an n-butoxy group and a tert-butoxy group), acyl groups (such as acetyl group, a propionyl group and a trifluoroacetyl group), acyloxy groups (such as an acetoxy group, a propionyloxy group and trifluoroacetoxy group), alkoxycarbonyl groups (such as a methoxycarbonyl group, an ethoxycarbonyl group and a tert-butoxycarbonyl group), and aryloxycarbonyl groups.

With respect to $R_{101}$ and $R_{102}$, as well as $R_{103}$ and $R_{104}$, two substituent groups on the same carbon atom may bond at each of their ends to make a divalent group and form a ring. These groups may be further provided with a substituent. The substituents include halogen atoms (such as a chlorine atom, a bromine atom and a fluorine atom), alkoxy groups having 1-6 carbon atoms (such as a methoxy group, an ethoxy group, an n-propoxy group, an iso-propoxy group, an n-butoxy group and a tert-butoxy group), acyl groups (such as acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group), aryloxycarbonyl groups, alkylsulfonyl groups, arylsulfonyl groups, a cyano group and a nitro group. Preferable substituents are halogen atoms, alkoxy groups, acyoxy groups and alkoxycarbonyl groups.

Oxetanes of this invention are preferably those provided with at least one substituent at 3-position of the oxetane ring. Preferable substituents are alkyl groups having 1-6 carbon atoms (such as a methyl group, an ethyl group, a propyl group, an isopropyl group and a butyl group), cycloalkyl groups having 3-6 carbon atoms (such as a cyclopropyl group, a cyclobutyl group, a cyclopentyl group and a cyclohexyl group), alkoxy groups having 1-6 carbon atoms (such as a methoxy group, an ethoxy group, an n-propoxy group, an iso-propoxy group, an n-butoxy group and a tert-butoxy group), acyl groups (such as acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group). These may further be substituted, and preferable substituents being halogen atoms, alkoxy groups, acyloxy groups and alkoxycarbonyl groups.

Oxetanes of this invention are preferably substituted at 3-position with a substituted or unsubstituted alkyl group, but it is more preferable that 3-position of oxetane becomes a tertiary carbon atom by being substituted with two alkyl groups. Preferable substituents of the alkyl group are halogen atoms, alkoxy groups, acyloxy groups and alkoxycarbonyl groups.

Oxetanes of this invention can be made more reactive by substituting the 4-position with an electron attractive group. An "electron attractive group" means a substituent having a positive value Hammett's substituent constant σp, and specific examples of electron attractive groups include —NO$_2$, —CN, —SO$_2$-Alkyl, —SO$_2$-Aryl, —CO-Alkyl, —CO-Aryl, —CO—O-Alkyl, —CO—O-Aryl and halogen atoms (such as a fluorine atom, a chlorine atom and a bromine atom). In oxetane compounds of this invention, preferable electron attractive groups as a substituent at the 4-position are alkyl groups, α-γ position carbons which are substituted with the foregoing electron attractive group, but specifically preferred are alkyl groups substituted with a fluorine atom.

In Formula (A), R$_{107}$ is a substituted or unsubstituted alkoxy group having at least 4 carbon atoms. The alkyl group may be a strait chain alkyl group, a branched alkyl group or a cyclic alkyl group. Flexibility of a cured ink layer is usually insufficient in the case of an alkyl group of carbon atoms of at least 3 as R$_{107}$. By employing an alkyl group having carbon atoms of at least 4, a flexibility providing effect to a cured layer is exhibited. With respect to providing flexibility, the larger number of carbon atoms, the more preferable; however, it is not preferable when the number of carbon atoms of R$_{107}$ is too large because of a simultaneous decrease of the curing rate results. Approximately 7-15 carbon atoms are preferred.

R$_{107}$ may be provided with a substituent, which includes a halogen atom (such as a chlorine atom, a bromine atom and a fluorine atom), an alkoxy group having 1-6 carbon atoms (such as a methoxy group, an ethoxy group, an n-propoxy group, an iso-propoxy group, an n-butoxy group and a tert-butoxy group), an acyl group (such as an acetyl group, a propionyl group and a trifluoroacetyl group), an acyloxy group (such as an acetoxy group, a propionyloxy group and a trifluoroacetoxy group), and an alkoxycarbonyl group (such as a methoxycarbonyl group, an ethoxycarbonyl group and a tert-butoxycarbonyl group).

Those possible to be substituted among these substituents, may further be provided with a substituent, and these substituents include halogen atoms (such as a chlorine atom, a bromine atom and a fluorine atom), alkyl groups having 1-6 carbon atoms (such as a methyl group, an ethyl group, a propyl group, an iso-propyl group and a butyl group), alkoxy groups having 1-6 carbon atoms (such as a methoxy group, an ethoxy group, an n-propoxy group, an iso-propoxy group, an n-butoxy group and a tertiary butoxy group), acyl groups (such as an acetyl group, a propionyl group and a trifluoroacetyl group), acyloxy groups (such as an acetoxy group, an propionyloxy group and a trifluoroacetoxy group), alkoxycarbonyl groups (such as a methoxycarbonyl group, an ethoxycarbonyl group and a tert-butoxycarbonyl group). Preferred substituents are halogen atoms, as well as substituted or unsubstituted alkoxy groups.

In the following pages, specific examples of oxetane compounds are shown, however, this invention is not limited thereto.

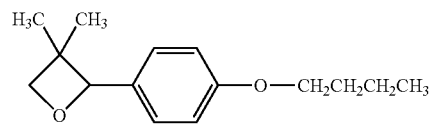
OX-1

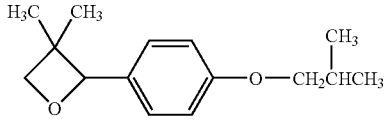
OX-2

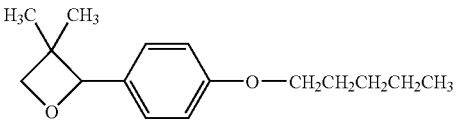
OX-3

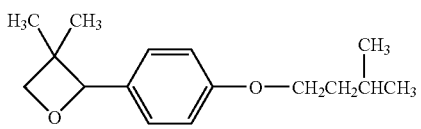
OX-4

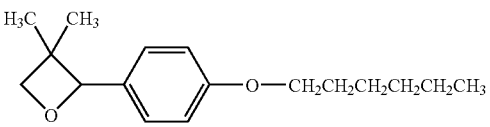
OX-5

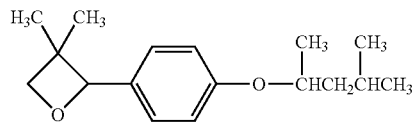
OX-6

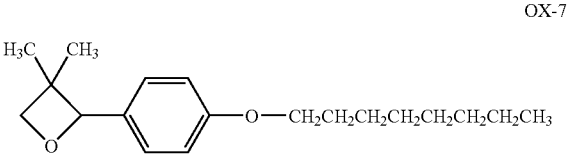
OX-7

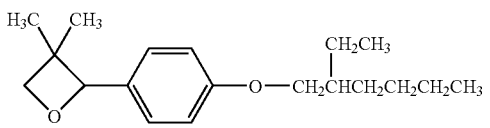
OX-8

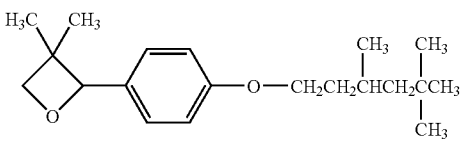
OX-9

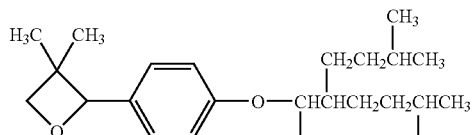
OX-10

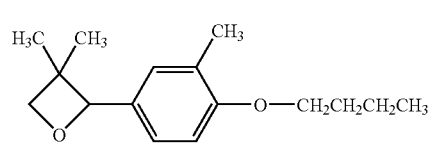
OX-11

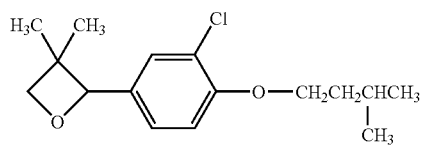
OX-12

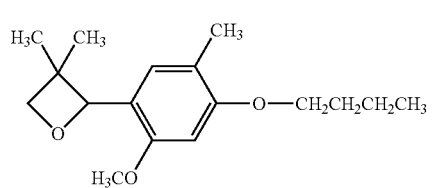
OX-13
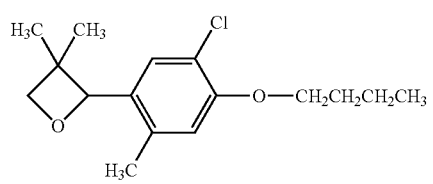
OX-14
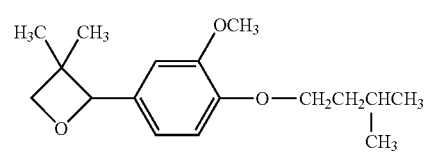
OX-15
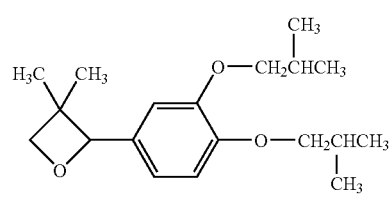
OX-16
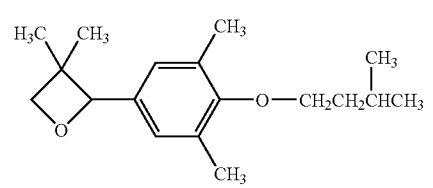
OX-17
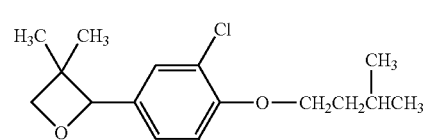
OX-18
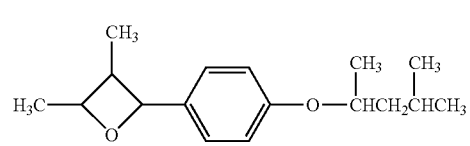
OX-19
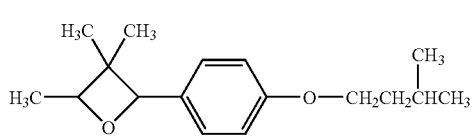
OX-20
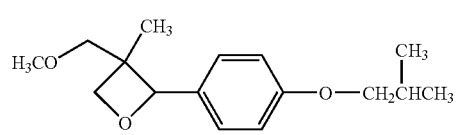
OX-21
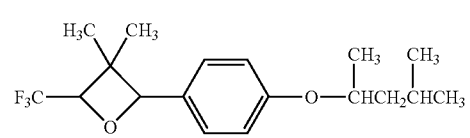
OX-22
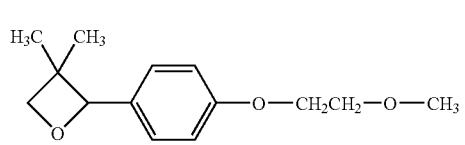
OX-23
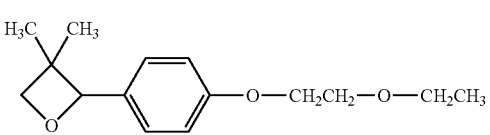
OX-24
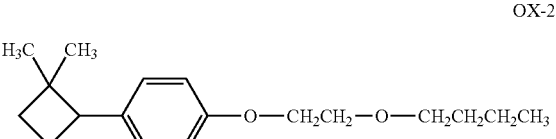
OX-25
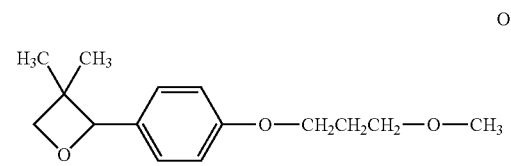
OX-26
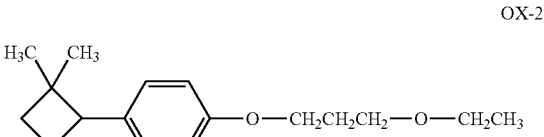
OX-27
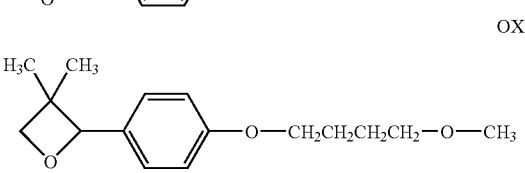
OX-28
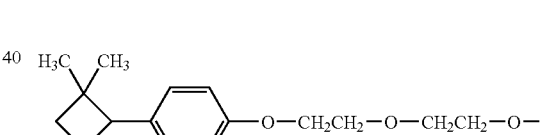
OX-29
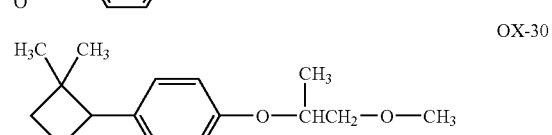
OX-30
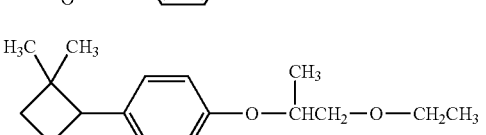
OX-31
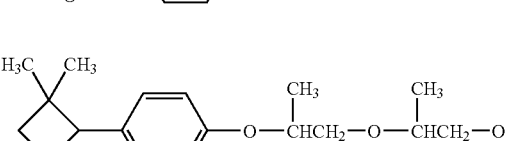
OX-32
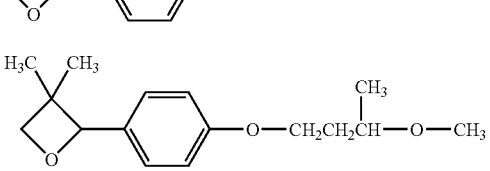
OX-33

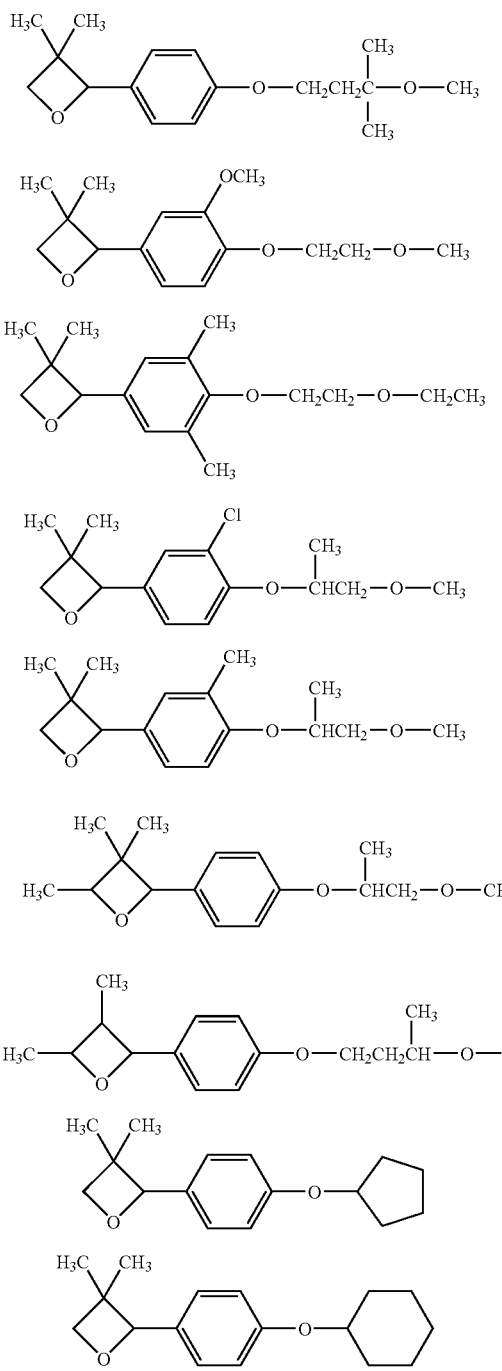

The synthesis of oxetane compounds of this invention can be performed employing the methods described in the following literature.

A: Hu Xianming, Richard M. Kellogg, Synthesis, pp. 533-538, May (1995)

B: A. O. Fitton, J. Hill, D. Ejane, R. Miller, Synth., vol. 12, pg. 1140 (1987)

C: Toshihiro Imai and Shinya Nishida, Can. J. Chem. Vol. 59, pp. 2503-2509 (1981)

D: Nobujiro Shimizu, Shintaro Yamaoka and Yuho Tsuno, Bull. Chem. Soc. Jpn., vol. 56, pp. 3853-3854 (1983)

E: Walter Fisher and Cyril A. Grob, Helv. Chim. Acta., vol. 61, pg. 2336 (1978)

F: Chem. Ber. Vol. 101, pg. 1850 (1968)

G: "Heterocyclic Compounds with Three- and Four-membered Rings", Part Two, Chapter IX, Interscience Publishers, John Wiley & Sons, New York (1964)

H: Bull. Chem. Soc. Jpn., vol. 61, pg. 1653 (1988)

I: Pure Appl. Chem. A29 (10), pg. 915 (1992)

J: Pure Appl. Chem. A30 (2 & amp; 3), pg. 189 (1993)

K: JP-A 6-16804

L: German Patent No. 1,021,858

In the following pages, synthesis examples of Exemplified Compounds are shown; however, this invention is not limited thereto.

SYNTHESIS EXAMPLE 1

Synthesis of Exemplified Compound OX-1: 1-n-Butoxy-4-(3,3-dimethyl-oxetane-2-yl)-benzene 2.5 equivalents of isobutylaldehyde and 1.0 equivalent of n-butoxy benzaldehyde were dissolved in methanol, then, titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling point substances were eliminated under reduced pressure of 1 mmHg (1 mmHg equals 133.322 Pa) from the mixture after concentration, resulting in preparation of a viscous oil, being 1-(4-n-butoxy-phenyl)-2,2-dimethyl-1,3-propanediol, at a yield of 60-65%.

$^1$H NMR (CD$_3$OD) δ (ppm): 0.81 & 0.85 (s, 6H, CH$_3$—), 1.00 (t, 3H, CH$_3$—), 1.50 (m, 2H, —CH$_2$—), 1.76 (m, 2H, —CH$_2$—), 3.05 (d, 1H, —OH), 3.40 (m, 1H, —OH), 3.45-3.60 (d, 2H, —CH$_2$—OH); 3.95 (m, 2H, —CH$_2$—), 4.60 [d, 1H, —CH(—OH)-benzyl position], 6.85 (d, 2H, —CH-benzene ring), 7.23 (d, 2H, —CH-benzene ring)

This tetraol compound was converted to a sulfonate in toluene by use of 1.1 time moles of methanesulfonyl chloride and 2.2 time moles of triethylamine. The reacted solution was added to 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the aimed oxetane, at a crude yield of 90-95%.

This crude product was purified with an alumina column to prepare an oxetane compound of Exemplified Compound OX-1, at a yield of 80-85%.

$^1$H NMR (CDCl$_3$) δ (ppm): 0.79 (s, 3H, CH$_3$—), 0.98 (t, 3H, CH$_3$—), 1.37 (s, 3H, CH$_3$—), 1.50 (m, 2H, —CH$_2$—), 1.77 (m, 2H, —CH$_2$—), 3.96 (m, 2H, —CH$_2$—), 4.25 (d, 1H, —O—CH$_2$-oxetane ring), 4.50 (d, 1H, —O—CH$_2$-oxetane ring), 5.44 (s, 2H; —CH—O-benzyl position on oxetane ring), 6.90 (d, 2H, —CH-benzene ring), 7.20 (d, 2H, —CH-benzene ring)

SYNTHESIS EXAMPLE 2

Synthesis of Exemplified Compound OX-2: 1-iso-Butoxy-4-(3,3-dimethyl-oxetane-2-yl)-benzene 2.5 equivalents of isobutylaldehyde and 1.0 equivalent of iso-butoxy benzaldehyde were dissolved in methanol, and titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling point substances were removed under reduced pressure of 1 mmHg from the mixture after concentration, resulting in preparation of a viscous oil, being 1-(4-iso-butoxy-phenyl)-2,2-dimethyl-1,3-propanediol, at a yield of 60-65%.

$^1$H NMR (CD$_3$OD) δ (ppm): 0.82 & 0.85 (s, 6H, CH$_3$—), 1.03 (d, 6H, CH$_3$—), 2.08 (m, 1H, >CH—), 3.21 (d, 1H, —OH), 3.40 (m, 1H, —OH), 3.45-3.60 (d, 2H, —CH$_2$—OH), 3.71 (m, 2H, —CH$_2$—O—), 4.59 [d, 1H, —CH(—OH)-benzyl position], 6.85 (d, 2H, —CH-benzene ring), 7.23 (d, 2H, —CH-benzene ring)

This tetraol compound was converted to a sulfonate in toluene by use of 1.1 time moles of methanesulfonyl chloride and 2.2 time moles of triethylamine. The reacted solution was added to 1 mol % of tetra-n-butylammonium hydrogensulfateand and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the aimed oxetane, at a crude yield of 90-95%.

This crude product was purified with an alumina column to prepare an oxetane compound of Exemplified Compound OX-2. The yield was 80-85%.

$^1$H NMR (CDCl$_3$) δ (ppm): 0.85 (s, 3H, CH$_3$—), 1.03 (d, 6H CH$_3$—), 1.37 (s, 3H; CH$_3$—), 2.07 (m, 1H, >CH—), 3.71 (d, 2H, —CH$_2$—O—), 4.24 (d, 1H, —O—CH$_2$-oxetane ring), 4.50 (d, 1H, —O—CH$_2$-oxetane ring), 5.44 (s, 2H, —CH—O-benzyl position on oxetane ring), 6.90 (d, 2H, —CH-benzene ring), 7.20 (d, 2H, —CH-benzene ring)

SYNTHESIS EXAMPLE 3

Synthesis of Exemplified Compound OX-23: 1-(2-Methoxy-ethoxy)-4-(3,3-dimethyl-oxetane-2-yl)-benzene 2.5 equivalents of isobutylaldehyde and 1.0 equivalent of 2-methoxy-ethoxy benzaldehyde were dissolved in methanol, and titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling, point substances were removed under reduced pressure of 1 mmHg from the mixture after concentration, resulting in preparation of a viscous oil, being 1-[4-(2-methoxy-ethoxy)-phenyl]-2,2-dimethyl-1,3-propanediol, at a yield of 60-65%.

$^1$H NMR (CD$_3$OD) δ (ppm): 0.80 & 0.83 ('s, 6H, CH$_3$—), 3.43 (s, 3H, CH$_3$—), 3.25 (m, 1H, —OH), 3.40 (m, 1H, —OH), 3.45-3.55 (d, 2H, —CH$_2$—OH), 3.74 & 4.10 (m, 4H, —O—CH$_2$—CH$_2$—O—), 4.56 [d, 1H, —CH(—OH)-benzyl position], 6.88 (d, 2H, —CH-benzene ring), 7.22 (d, 2H, —CH-benzene ring)

This tetraol compound was converted to a sulfonate in toluene by use of 1.1 time moles of methanesulfonyl chloride of and 2.2 time moles of triethylamine. The reacted solution was added with 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the aimed oxetane, at a crude yield of 90-95%.

This crude product was purified with an alumina column to prepare an oxetane compound of Exemplified Compound OX-23, at a yield of 80-85%.

1H NMR (CDCl$_3$) δ (ppm): 0.78 (s, 3H, CH$_3$—), 1.37 (s, 3H, CH$_3$—), 3.46 (s, 3H, CH$_3$—), 3.75 & 4.12 (m, 4H, —O—CH$_2$—CH$_2$—O—), 4.24 (d, 1H, —O—CH$_2$-oxetane ring), 4.50 (d, 1H, —O—CH$_2$-oxetane ring), 5.44 (s, 2H, —CH—O-benzyl position on oxetane ring), 6.94 (d, 2H, —CH-benzene ring), 7.21 (d, 2H, —CH-benzene ring)

SYNTHESIS EXAMPLE 4

Synthesis of Exemplified Compound OX-30: 1-(1-Methyl-Methoxy-ethoxy)-4-(3,3-dimethyl-oxetane-2-yl)-benzene 2.5 equivalents of isobutylaldehyde and 1.0 equivalent of 1-methyl-2-methoxyethoxy benzaldehyde were dissolved in methanol, and titrated into the resulting solution was 1.5 equivalents of a methanol solution of potassium hydroxide at room temperature. Next, after a 4 hour reaction at 60° C., extraction with ethyl acetate from the reacted solution was performed and the ethyl acetate extract was concentrated under reduced pressure. Low boiling point substances were removed under reduced pressure of 1 mmHg from the mixture after concentration, resulting in preparation of a viscous oil, being 1-[4-(1methyl-2-methoxy-ethoxy)-phenyl]-2,2-dimethyl-1,3-propanediol, at a yield of 60-65%.

1H NMR (CD$_3$OD) δ (ppm): 0.81 & 0.85 (s, 6H, CH$_3$—), 1.31 (m, 3H, CH$_3$—CH<), 3.40 (s, 3H, CH$_3$—O—), 3.07 (m, 1H, —OH), 3.15 (m, 1H, —OH), 3.47 (m, 2H, —CH$_2$—OH<), 3.50-3.60 (d, 2H, —CH$_2$—OH), 4.52 (m, 1H, >CH—CH$_2$—O—), 4.57 [d, 1H, —CH(—OH)-benzyl position], 6.89 (d, 2H, —CH-benzene ring), 7.22 (d, 2H, —CH-benzene ring)

This tetraol compound was converted to a sulfonate in toluene by use of 1.1 time moles of methanesulfonyl chloride, and 2.2 time moles of triethylamine. The reacted solution was added to 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the targeted oxetane, at a crude yield of 90-95%.

This crude product was purified with an alumina column to prepare an oxetane compound of Exemplified Compound OX-30, at a yield of 80-85%.

$^1$H NMR (CDCl$_3$) δ (ppm): 0.86 (s, 3H, CH$_3$—), 1.31 (m, 3H, CH$_3$—CH<), 1.36 (s, 3H, CH$_3$—), 3.41 (s, 3H, CH$_3$—O—), 3.50 & 3.58 (m, 2H, —CH$_2$—CH<), 4.24 (d, 1H, —O—CH$_2$-oxetane ring), 4.50 (d, 1H, —O—CH$_2$-oxetane ring), 4.56 (m, 1H, >CH—CH$_2$—O—), 5.44 (s, 2H, —CH—O-benzylposition on oxetane ring), 6.94 (d, 2H, —CH-benzene ring), 7.20 (d, 2H, —CH-benzene ring)

SYNTHESIS EXAMPLE 5

Synthesis of Exemplified Compound OX-8: 1-(2-Ethylhexyl-oxy)-4-(3,3-dimethyl-oxetane-2-yl)-benzene 2.5 equivalents of isobutylaldehyde and 1.0 equivalent of 2-ethylhexyloxy benzaldehyde were dissolved in methanol, and titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling point substances were removed under reduced pressure of 1 mmHg from the mixture after concentration, resulting in preparation of a viscous oil, being 1-[(2-ethylhexyl-oxy)-phenyl]-2,2-dimethyl-1,3-propanediol, at a yield of 60-65%.

$^1$H NMR (CD$_3$OD) δ (ppm): 0.82 & 0.85 (s, 6H, CH$_3$—), 1.00 (d, 6H, CH$_3$—), 1.40-1.60 (m, 8H, —CH$_2$—), 2.05 (m, 1H, >CH—), 3.22 (d, 1H, —OH), 3.41 (m, 1H, —OH), 3.45-3.60 (d, 2H, —CH$_2$—OH), 3.93 (m, 2H, —CH$_2$—O—), 4.59 [d, 1H, —CH(—OH)-benzyl position], 6.85 (d, 2H, —CH-benzene ring), 7.23 (d, 2H, —CH-benzene ring)

This tetraol compound was converted to a sulfonate by use of 1.1 time moles of methanesulfonyl chloride and 2.2 time moles of triethylamine in toluene. The reacted solution was added to 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the targeted oxetane, at a crude yield of 90-95%.

This crude product was purified with an alumina column to prepare an oxetane compound of Exemplified Compound OX-8, at a yield of 80-85%.

$^1$H NMR (CDCl$_3$) δ (ppm): 0.86 (s, 3H, CH$_3$—), 1.03 (t, 6H CH$_3$—), 1.38 (s, 3H, CH$_3$—), 1.40-1.60 (m, 8H, —CH$_2$—), 2.07 (m, 1H, >CH—), 3.96 (m, 2H, —CH$_2$—), 4.24 (d, 1H, —O—CH$_2$-oxetane ring), 4.50 (d, 1H, —O—CH$_2$-oxetane ring), 5.44 (s, 2H, —CH—O-benzyl position on oxetane ring), 6.90 (d, 2H, —CH-benzene ring), 7.20 (d, 2H, —CH-benzene ring)

SYNTHESIS EXAMPLE 6

Synthesis of Exemplified Compound OX-9: 1-(3,3,5-Trimethylhexyl-oxy)-4-(3,3-dimethyl-oxetane-2-yl)-benzene 2.5 equivalents of isobutylaldehyde and 1.0 equivalent of 3,3,5-trimethylhexyl-oxy benzaldehyde were dissolved in methanol, and titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling point substances were removed under reduced pressure of 1 mmHg from the mixture after concentration, resulting in preparation of a viscous oil, being 1-(3,3,5-trimethylhexyl-oxy)-phenyl]-2,2-dimethyl-1,3-propanediol, at a yield of 60-65%.

$^1$H NMR (CD$_3$OD) δ (ppm): 0.82 & 0.85 (s, 6H, CH$_3$—), 1.10 (s, 9H, CH$_3$—), 1.10 (s, 9H, CH$_3$—), 1.20 (d, 2H, —CH$_2$—), 1.70 (m, 1H, >CH—), 1.75 (m, 2H, —CH$_2$—), 3.21 (d, 1H, —OH), 3.40 (m, 1H, OH), 3.45-3.60 (d, 2H, —CH$_2$—OH), 3.95 (m, 2H, —CH$_2$—O—), 4.59 [d, 1H, —CH(—OH)-benzyl position], 6.85 (d, 2H, —CH-benzene ring), 7.23 (d, 2H, —CH-benzene ring)

This tetraol compound was converted to a sulfonate in toluene by use of 1.1 time moles of methanesulfonyl chloride and 2.2 time moles of triethylamine. The reacted solution was added with 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the targeted oxetane, at a crude yield of 90-95%.

This crude product was purified with an alumina column to prepare an oxetane compound of Exemplified Compound OX-9, at a yield of 80-85%.

$^1$H NMR (CDCl$_3$) δ (ppm): 0.85 (s, 3H, CH$_3$—), 1.12 (s, 9H, CH$_3$—), 1.20 (d, 2H, —CH$_2$—), 1.37 (s, 3H, CH$_3$—), 1.70 (m, 1H, >CH—), 3.96 (d, 2H, —CH$_2$—O—), 4.24 (d, 1H, —O—CH$_2$-oxetane ring), 4.50 (d, 1H, —O—CH$_2$-oxetane ring), 5.44 (s, 2H, —CH—O-benzyl position on oxetane ring), 6.90 (d, 2H, —CH-benzene ring), 7.20 (d, 2H, —CH-benzene ring)

SYNTHESIS EXAMPLE 7

Synthesis of Exemplified Compound OX-33: 1-(3-Methoxy-butoxy)-4-(3,3-dimethyl-oxetane-2-yl)-benzene 2.5 equivalents of isobutylaldehyde and 1.0 equivalent of 3-methoxybutoxy benzaldehyde were dissolved in methanol, then titrated into the resulting solution was 1.5 equivalents of a methanol solution of potassium hydroxide at room temperature. After a 4 hour reaction at 60° C., extraction with ethyl acetate from the reacted solution was performed and the ethyl acetate extract was concentrated under reduced pressure. Low boiling point substances were removed under reduced pressure of 1 mmHg from the mixture after concentration, resulting in preparation of a viscous oil, being 1-[4-(3-methoxy-butoxy)-phenyl]-2,2-dimethyl-1,3-propanediol, at a yield of 60-65%.

$^1$H NMR (CD$_3$OD) δ (ppm): 0.81 & 0.85 (s, 6H, CH$_3$—), 1.16 (d, 3H, CH$_3$—CH<), 2.01 (m, 2H, —CH$_2$—CH<), 3.07 (m, 1H, —OH), 3.15 (m, 1H, >CH—OCH$_3$), 3.20 (m, 1H, —OH), 3.40 (s, 3H, CH$_3$—O—), 3.95 (m, 2H, —CH$_2$—), 3.50-3.60 (d, 2H, —CH$_2$—OH), 4.57 [d, 1H, —CH(—OH)-benzyl position], 6.89 (d, 2H, —CH-benzene ring), 7.22 (d, 2H, —CH-benzene ring)

This tetraol compound was converted to a sulfonate in toluene by use of 1.1 time moles of methanesulfonyl chloride and 2.2 time moles of triethylamine. The reacted solution was added with 1 mol % of tetra-n-butylammonium hydrogensulfate and a 50% sodium hydroxide solution (10 equivalents), after having been washed until the pH of the water phase became 7, and further reacted at 30±5° C. for 6 hours. The reacted solution was concentrated under reduced pressure after having been washed with water and dehydrated with magnesium sulfate anhydride, resulting in preparation of the targeted oxetane, at a crude yield of 90-95%.

This crude product was purified with an alumina column to prepare an oxetane compound of Exemplified Compound OX-33, at a yield of 80-85%.

$^1$H NMR (CDCl$_3$) δ (ppm): 0.86 (s, 3H, CH$_3$—), 1.16 (d, 3H, CH$_3$—CH<), 1.36 (s, 3H, CH$_3$—), 2.01 (m, 2H, —CH$_2$—CH<), 3.16 (m, 1H, >CH—OCH$_3$), 3.41 (s, 3H, CH$_3$—O—), 3.53 & 3.60 (m, 2H, —CH$_2$—CH<), 3.95 (m, 2H, —CH$_2$—), 4.24 (d, 1H, —O—CH$_2$-oxetane ring), 4.50 (d, 1H, —O—CH$_2$-oxetane ring), 5.44 (s, 2H, —CH—O-benzyl position on oxetane ring), 6.94 (d, 2H, —CH-benzene ring), 7.20 (d, 2H, —CH-benzene ring)

Other oxetane compounds of this invention can be efficiently synthesized by similar methods.

The addition amount of the oxetane compound of this invention is preferably 10-40 weight %. When it is less than 10 weight %, flexibility is insufficiently exhibited by the cured layer. While, when it is over 40 weight %, the physical layer properties are weak, rendering the compound unviable. The oxetane compounds of this invention may be utilized alone or in appropriate combinations of at least two types.

In the ink-jet ink of this invention, it is an essential structural condition to incorporate an epoxy compound together with an oxetane compound represented by Formula (A).

In epoxy compounds, a preferable aromatic epoxide is di- or poly-glycidylether, which is prepared via a reaction of polyhydric phenol provided with at least one aromatic nuclear or an alkyleneoxide adduct thereof with epichlorohydrin, and includes, for example, di- or poly-glycidylether of bisphenol A or an alkyleneoxide adduct thereof, di- or poly-glycidylether of hydrogenated bisphenol A or an alkyleneoxide adduct thereof, and novolac type epoxy resin. Herein, alkyleneoxides include ethyleneoxide and propyleneoxide.

Alicyclic epoxide is preferably a cyclohexeneoxide-incorporating or cycropenteneoxide-incorporating compound which is prepared by epoxidation of a compound provided with at least one cycloalkane ring, such as a cyclohexene or cyclopentene ring by use of an appropriate oxidant such as hydrogen peroxide or peracid.

Preferable aliphatic epoxides include a di- or poly-glycidylether of aliphatic polyhydric alcohol or an alkyleneoxide adduct thereof, typical examples thereof include diglycidylethers of alkylene glycol such as diglycidylether of ethylene glycol, diglycidylether of propylene glycol or diglycidylether of 6-hexanediol; polyglycidylethers of polyhydric alcohol such as a di- or tri-glycidylether of glycerin or alkyleneoxide adduct thereof; and diglycidylethers of polyalkylene glycol such as diglycidylether of polyethylene glycol or an alkyleneoxide adduct thereof and diglycidylether of polypropylene glycol or an alkyleneoxide adduct thereof. Herein, alkyleneoxides include ethyleneoxide and propyleneoxide.

Among these epoxides, aromatic epoxides and alicyclic epoxides are preferred and alicyclic epoxides are specifically preferred, when considering rapid curing capability. In this invention, the above-described epoxides may be utilized alone or in appropriate combinations of at least two types.

Alicyclic epoxides are preferably poly-functional epoxide compounds represented by foregoing Formula (B), in which $R_{201}$, and $R_{202}$ each are a substituent, examples of which include halogen atoms (such as a chlorine atom, a bromine atom and a fluorine atom), alkyl groups having 1-6 carbon atoms (such as a methyl group, an ethyl group, a propyl group, an isopropyl group and a butyl group), alkoxy groups having 1-6 carbon atoms (such as a methoxy group, an ethoxy group, an n-propoxy group, an iso-propoxy group, an n-butoxy group and a tert-butoxy group), acyl groups (such as acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

$m_{20}$ and $n_{20}$ each are an integer of 0-2 but preferably 0 or 1.

$L_0$ is a single bond or a linking group having a valency of r0+1 and 1-15 carbon atoms, provided that $L_0$ may contain an oxygen atom or a sulfur atom in the main chain. Examples of divalent linking groups which have 1-15 carbon atoms, provided that they may contain an oxygen atom or a sulfur atom in the main chain, include the following groups, and groups formed by combining these groups with a plural number of —O— groups, —S— groups, —CO— groups and —CS— groups.

methylene group: —CH$_2$—
ethylidene group: >CHCH$_3$
isopropilydene group: >C(CH$_3$)$_2$
1,2-ethylene group: —CH$_2$CH$_2$—
1,2-propylene group: —CH(CH$_3$)CH$_2$—
1,3-propane diyl group: —CH$_2$CH$_2$CH$_2$—
2,2-dimethyl-1,3-propane diyl group: —CH$_2$C(CH$_3$)$_2$CH$_2$—
2,2-dimethoxy-1,3-propane diyl group: —CH$_2$C(OCH$_3$)$_2$CH$_2$—
2,2-dimethoxymethyl-1,3-propane diyl group: —CH$_2$C(CH$_2$OCH$_3$)$_2$CH$_2$—
1-methyl-1,3-propane diyl group: —CH(CH$_3$)CH$_2$CH$_2$—
1,4-butane diyl group: —CH$_2$CH$_2$CH$_2$CH$_2$—
1,5-pentane diyl group: —CH$_2$CH$_2$CH$_2$CH$_2$CH$_2$—
oxydiethylene group: —CH$_2$CH$_2$OCH$_2$CH$_2$—
thiodiethylene group: —CH$_2$CH$_2$SCH$_2$CH$_2$—
3-oxothiodiethylene group: —CH$_2$CH$_2$SOCH$_2$CH$_2$—
3,3-dioxothiodiethylene group: —CH$_2$CH$_2$SO$_2$CH$_2$CH$_2$—
1,4-dimethyl-3-oxa-1,5-pentane diyl group: —CH(CH$_3$)CH$_2$OCH(CH$_3$)CH$_2$—
3-oxopentane diyl group: —CH$_2$CH$_2$COCH$_2$CH$_2$—
1,5-dioxo-3-oxapentane diyl group: —COCH$_2$OCH$_2$CO—
4-oxa-1,7-heptane diyl group: —CH$_2$CH$_2$CH$_2$OCH$_2$CH$_2$CH$_2$—
3,6-dioxa-1,8-octane diyl group: —CH$_2$CH$_2$OCH$_2$CH$_2$OCH$_2$CH$_2$—
1,4,7-trimethyl-3,6-dioxa-1,8-octane diyl group: —CH(CH$_3$)CH$_2$OCH(CH$_3$)CH$_2$OCH(CH$_3$)CH$_2$—
5,5-dimethyl-3,7-dioxa-1,9-nonane diyl group: —CH$_2$CH$_2$OCH$_2$C(CH$_3$)$_2$CH$_2$OCH$_2$CH$_2$—
5,5-dimethoxy-3,7-dioxa-1,9-nonane diyl group: —CH$_2$CH$_2$OCH$_2$C(OCH$_3$)$_2$CH$_2$OCH$_2$CH$_2$—
5,5-dimethoxymethyl-3,7-dioxa-1,9-nonane diyl group: —CH$_2$CH$_2$OCH$_2$C(CH$_2$OCH$_3$)$_2$CH$_2$OCH$_2$CH$_2$—
4,7-dioxo-3,8-dioxa-1,10-decane diyl group: —CH$_2$CH$_2$O—COCH$_2$CH$_2$CO—OCH$_2$CH$_2$—
3,8-dioxo-4,7-dioxa-1,10-decane diyl group: —CH$_2$CH$_2$CO—OCH$_2$CH$_2$O—COCH$_2$CH$_2$—
1,3-cyclopentane diyl group: -1,3-C$_5$H$_8$—
1,2-cyclohexane diyl group: -1,2-C$_6$H$_{10}$—
1,3-cyclohexane diyl group: -1,3-C$_6$H$_{10}$—
1,4-cyclohexane diyl group: -1,4-C$_6$H$_{10}$—
2,5-tetrahydrofurandi-yl group: -2,5-C$_4$H$_6$O—
p-phenylene group: -p-C$_6$H$_4$—
m-phenylene group: -m-C$_6$H$_4$—
α,α'-o-xylylene group: -o-CH$_2$—C$_6$H$_4$—CH$_2$—
α,α'-m-xylylene group: -m-CH$_2$—C$_6$H$_4$—CH$_2$—
α,α'-p-xylylene group: -p-CH$_2$—C$_6$H$_4$—CH$_2$—
fran-2,5-diyl-bismethylene group: -2,5-CH$_2$—C$_4$H$_2$O—CH$_2$—
thiophene-2,5-diyl-bismethylene group: -2,5-CH$_2$—C$_4$H$_2$S—CH$_2$—
isopropylidenebis-p-phenylene group: -p-C$_6$H$_4$—C(CH$_3$)$_2$-p-C$_6$H$_4$—

Linking groups being at least tri-valent include groups formed by removing a necessary number of hydrogen atoms at appropriate positions from any of the divalent linking groups described above, and groups formed by combining them with a plural number from an —O— group, an —S— group, a —CO— group or a —CS— group.

$L_0$ may contain a substituent. Examples of such substituents include halogen atoms (such as a chlorine atom, a bromine atom and a fluorine atom), alkyl groups having 1-6 carbon atoms (such as a methyl group, an ethyl group, a propyl group, an isopropyl group and a butyl group), alkoxy groups having 1-6 carbon atoms (such as a methoxy group, an ethoxy group, an n-propoxy group, an iso-propoxy group, an n-butoxy group and a tert-butoxy group), acyl groups (such as an acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

$L_0$ is preferably a divalent linking group having 1-8 carbon atoms, provided that $L_0$ may contain an oxygen atom or a sulfur atom in the main chain, but more preferably a divalent linking group having 1-5 carbon atoms, and a main chain of which is comprised of only carbon atoms.

Specifically preferable alicyclic epoxides are compounds represented by foregoing Formula (I) or (II), with respect to forming a cured layer having elevated hardness and enhanced adhesion of the cured layer to the substrate.

In Formula (I) or (II), $R_{211}$, $R_{212}$ and $R_{213}$ each are a substituent, and examples of such substituents include halogen atoms (such as a chlorine atom, a bromine atom and a fluorine atom), alkyl groups having 1-6 carbon atoms (such as a methyl group, an ethyl group, a propyl group, an isopropyl group and a butyl group), alkoxy groups having 1-6 carbon atoms (such as a methoxy group, an ethoxy group, an n-propoxy group, an iso-propoxy group, an n-butoxy group and a tert-butoxy group), acyl groups (such as an acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

$m_{21}$, $n_{21}$, $m_{22}$ and $n_{22}$ each are an integer of 0-2 but preferably 0 or 1.

$L_1$ is a single bond, or a linking group having a valency of r1+1 and 1-15 carbon atoms, provided that $L_1$ may contain an oxygen atom or a sulfur atom in the main chain, or a single bond, and $L_2$ is a single bond or a linking group having a valency of r2+1 and 1-15 carbon atoms, which may contain an oxygen atom or a sulfur atom in the main chain, or a single bond.

Examples of a divalent linking group, which has 1-15 carbon atoms and may contain an oxygen atom or a sulfur atom in the main chain, include the same as those described in the explanation of $L_0$.

$L_1$ and $L_2$ are preferably divalent linking groups having 1-8 carbon atoms and may contain an oxygen atom or a sulfur atom in the main chain, but more preferably divalent linking groups having 1-5 carbon atoms and the main chain of which is comprised of only carbon atoms.

Specifically preferable alicyclic epoxides are compounds represented by foregoing Formula (III) or (IV), with respect to a high curing sensitivity which is barely affected by variation in printing environment.

In Formula (III) or (IV), $R_{231}$, $R_{232}$, $R_{233}$ and $R_{234}$ each are a substituent, examples of which include halogen atoms (such as a chlorine atom, a bromine atom and a fluorine atom), alkyl groups having 1-6 carbon atoms (such as a methyl group, an ethyl group, a propyl group, an isopropyl group and a butyl group), alkoxy groups having 1-6 carbon atoms (such as a methoxy group, an ethoxy group, an n-propoxy group, an iso-propoxy group, an n-butoxy group and a tert-butoxy group), acyl groups (such as an acetyl group, a propionyl group and a trifluoroacetyl group), acyloxy groups (such as an acetoxy group, a propionyloxy group and a trifluoroacetoxy group), alkoxycarbonyl groups (such as a methoxycarbonyl group, an ethoxycarbonyl group and a tert-butoxycarbonyl group). Preferable substituents are alkyl groups, alkoxy groups and alkoxycarbonyl groups.

$m_{23}$, $n_{23}$, $m_{24}$ and $n_{24}$ each are an integer of 0-2 but preferably 0 or 1.

$L_3$ is a single bond or a linking group having a valency of r3+1, which has 1-15 carbon atoms and may contain an oxygen atom or a sulfur atom in the main chain, while $L_4$ is a single bond or a linking group having a valency of r4+1, which has 1-15 carbon atoms and may contain an oxygen atom or a sulfur atom in the main chain.

Examples of a divalent linking group, which has 1-15 carbon atoms and may contain an oxygen atom or a sulfur atom in the main chain, include the same as those explained for $L_0$.

$L_3$ and $L_4$ are preferably divalent linking groups having 1-8 carbon atoms and may contain an oxygen atom or a sulfur atom in the main chain, but are more preferably divalent linking groups having 1-5 carbon atoms and the main chain of which is comprised of only carbon atoms.

In the following, specific examples of preferable alicyclic epoxides are shown; however, this invention is not limited thereto.

EP-1

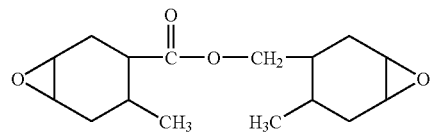

EP-2

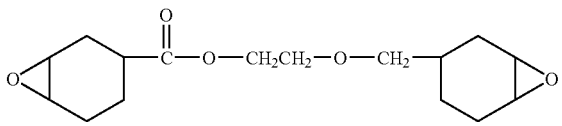

EP-3

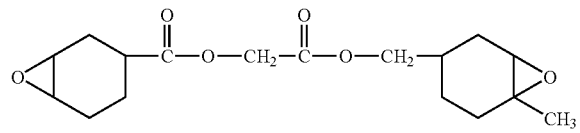

EP-4

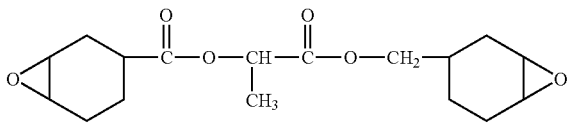

-continued
EP-5
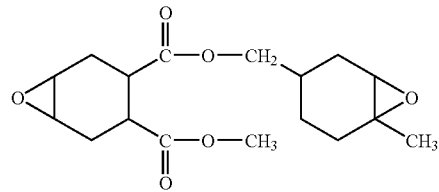
EP-6
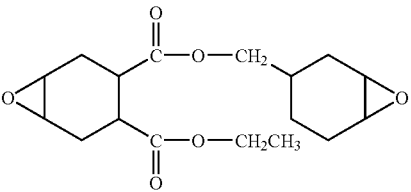
EP-7
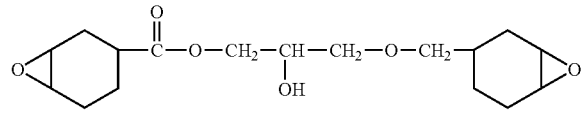
EP-8
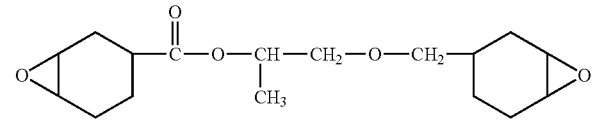
EP-9
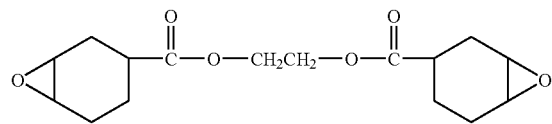
EP-10
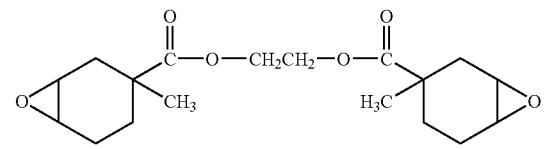
EP-11
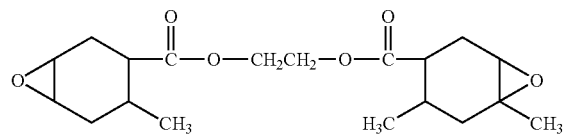
EP-12
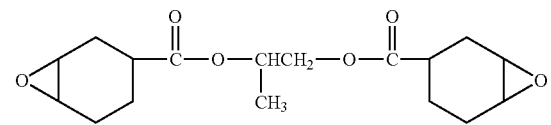
EP-13
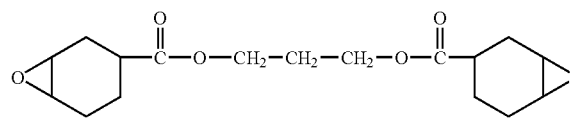
EP-14
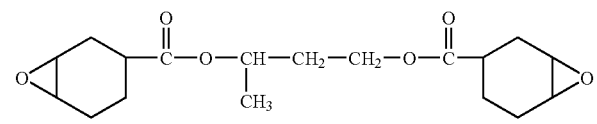
EP-15
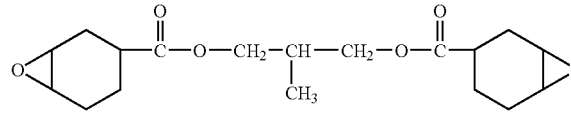
EP-16
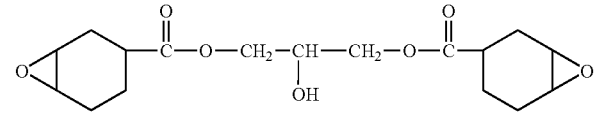
EP-17
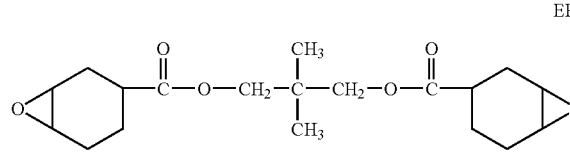
EP-18
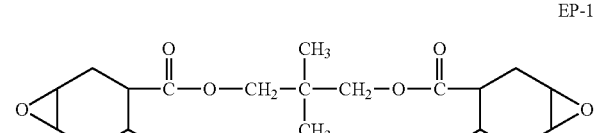
EP-19
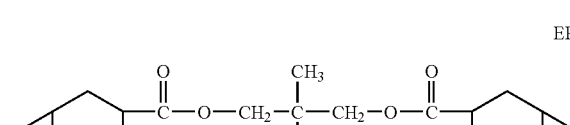
EP-20
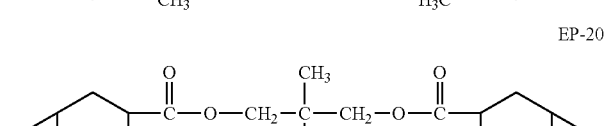
EP-21
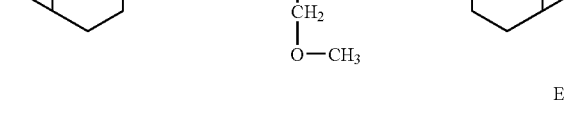
EP-22
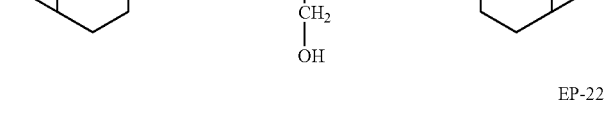

-continued
EP-23
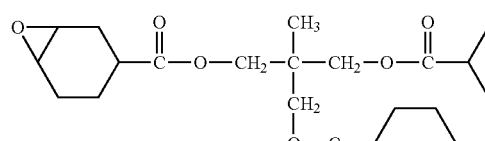
EP-24
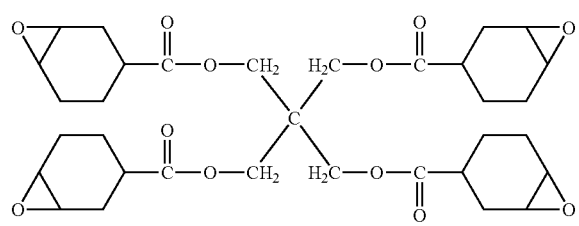
EP-25
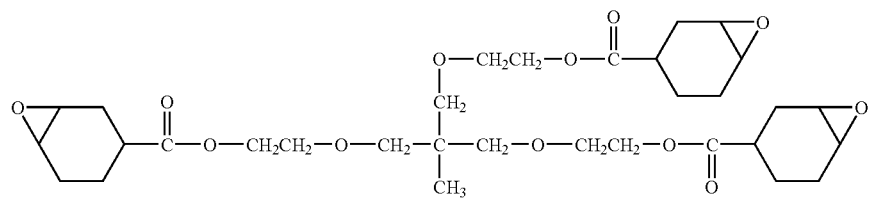
EP-26
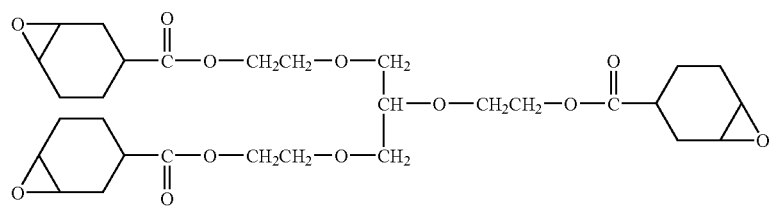
EP-27
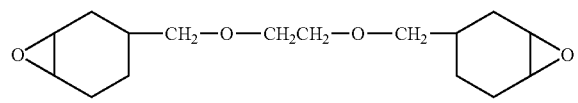
EP-28
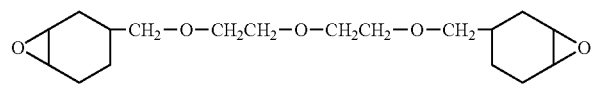
EP-29
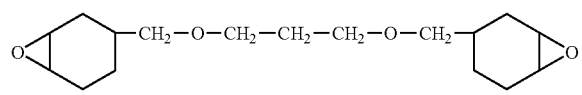
EP-30
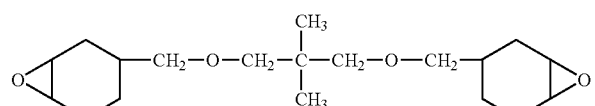
EP-31
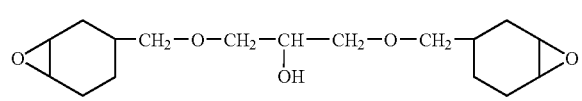
EP-32
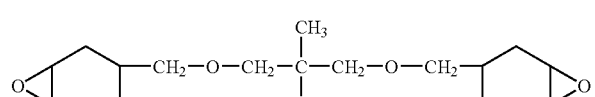
EP-33
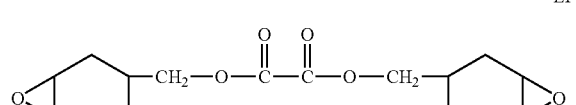
EP-34
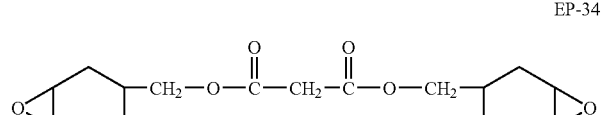
EP-35
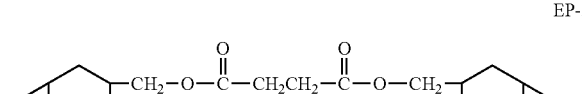
EP-36
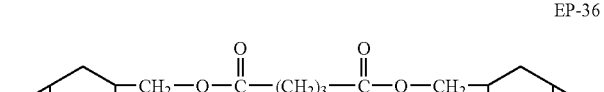
EP-37
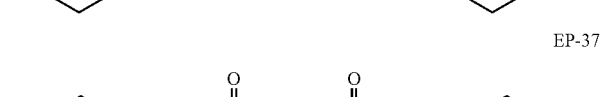
EP-38

-continued
EP-39
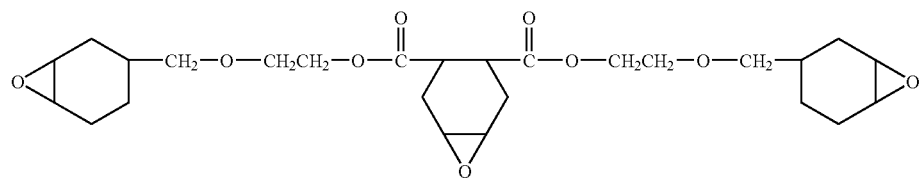
EP-40
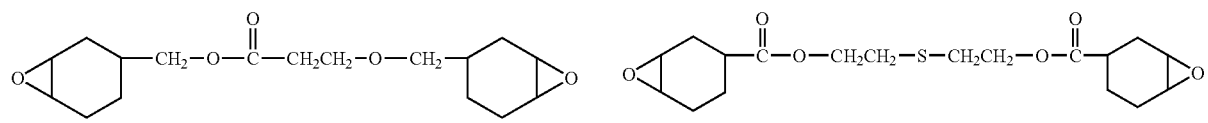
EP-41
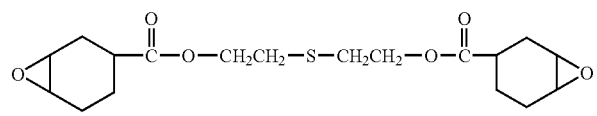
EP-42
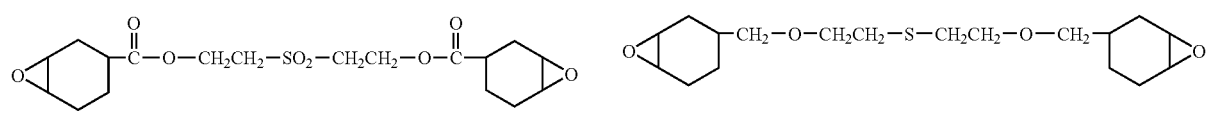
EP-43
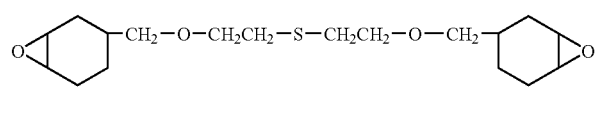
EP-44
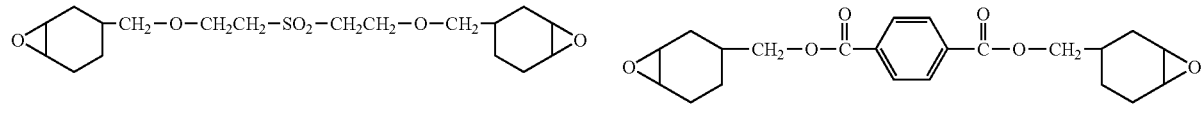
EP-45
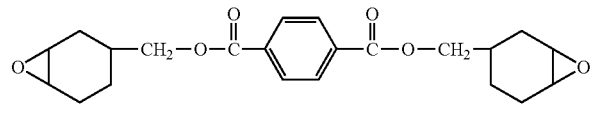
EP-46
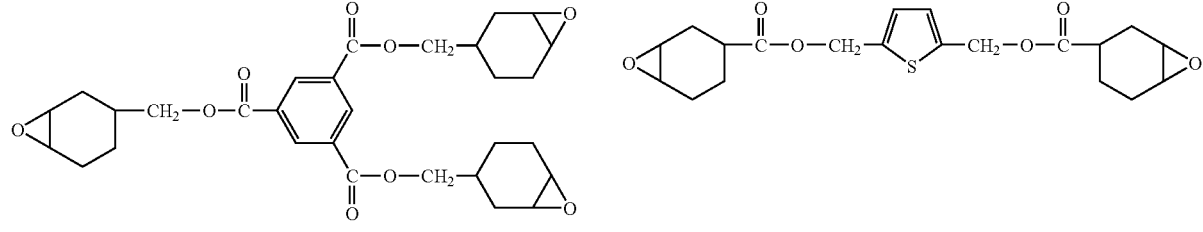
EP-47
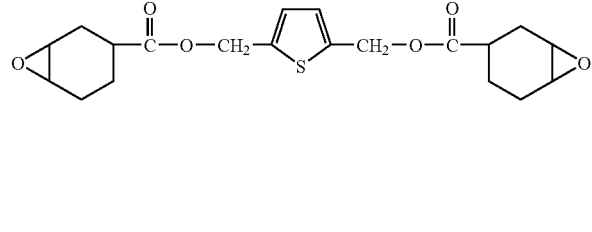
EP-48
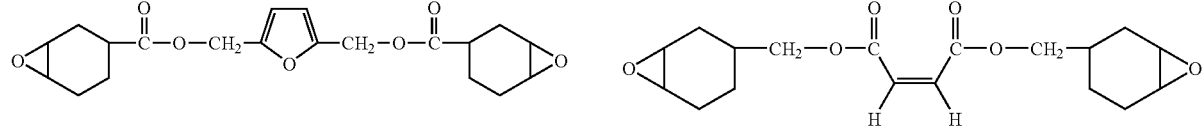
EP-49
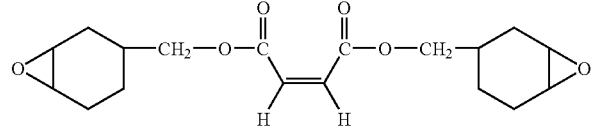
EP-50
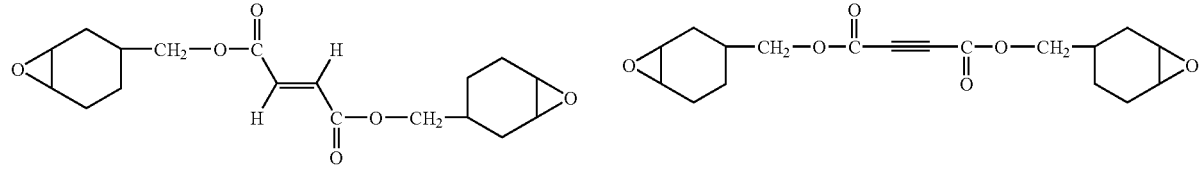
EP-51
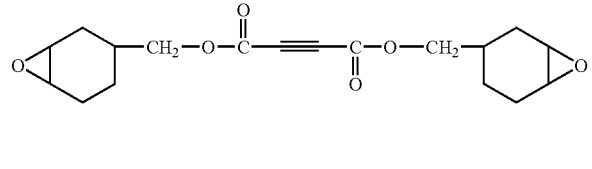
EP-52
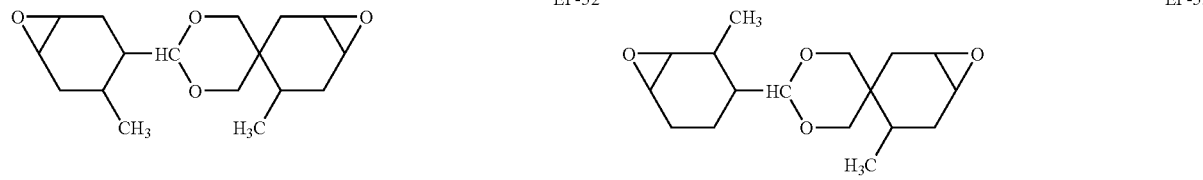
EP-53
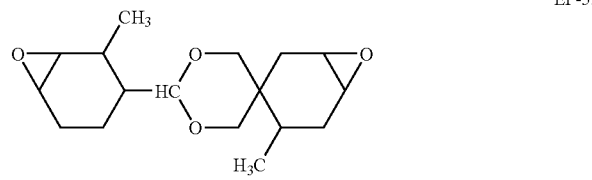
EP-54
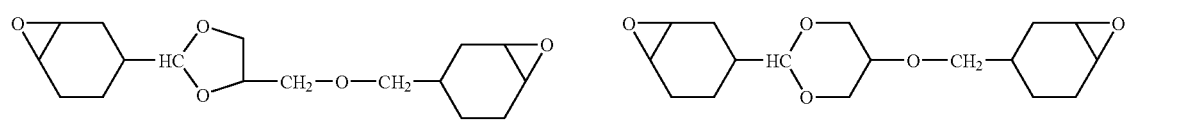
EP-55

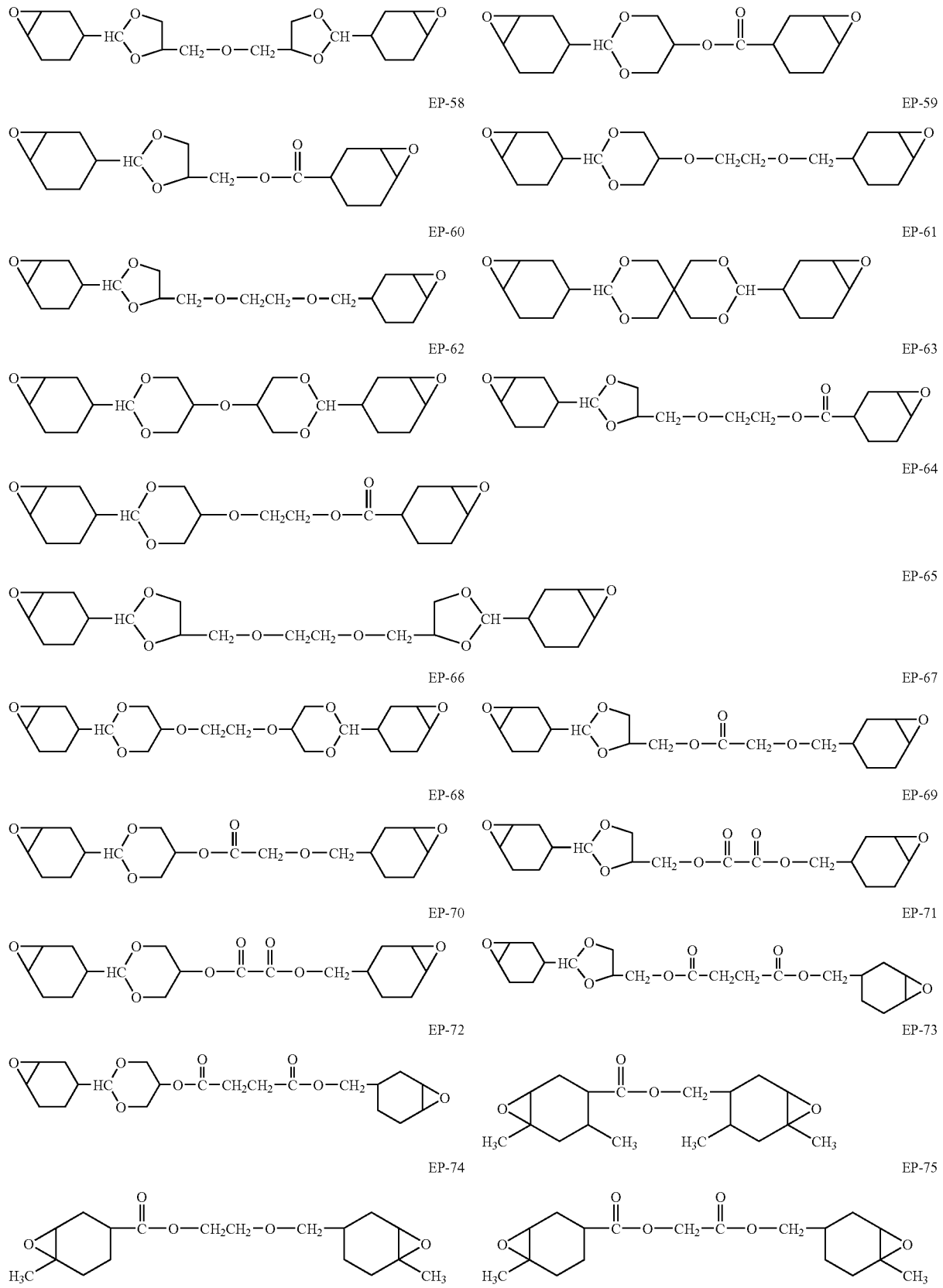

-continued
EP-76 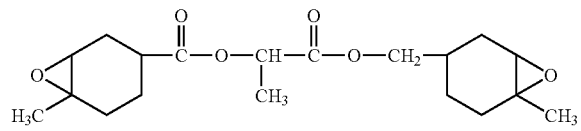 EP-77 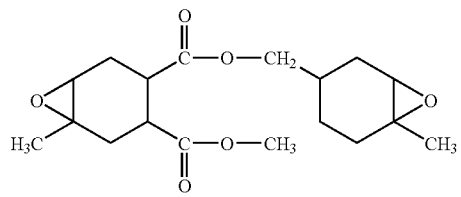
EP-78 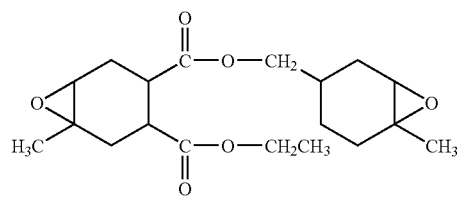 EP-79 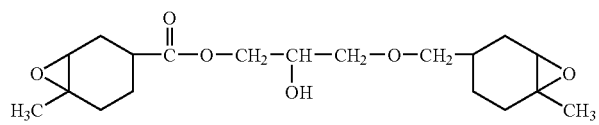
EP-80 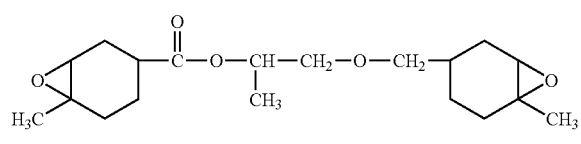 EP-81 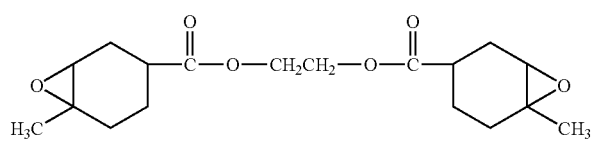
EP-82 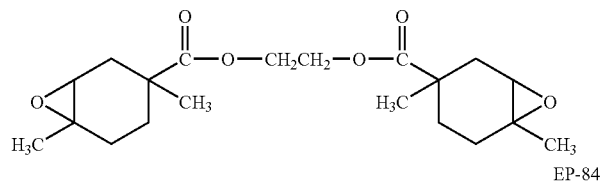 EP-83 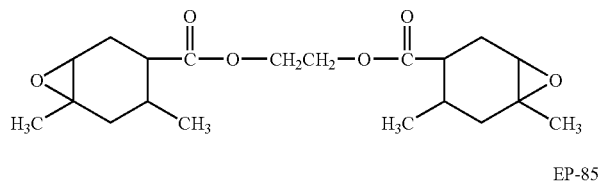
EP-84 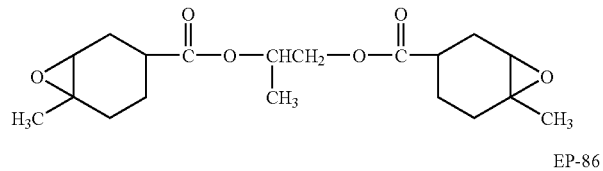 EP-85 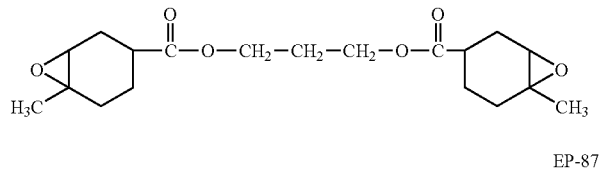
EP-86 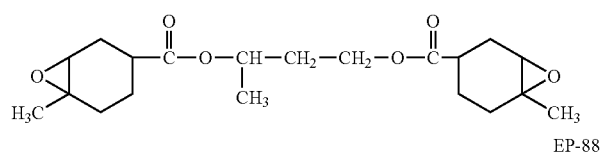 EP-87 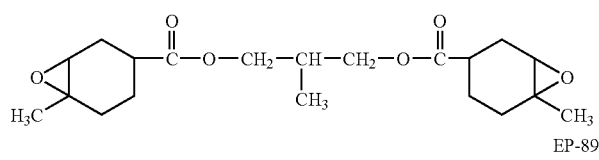
EP-88 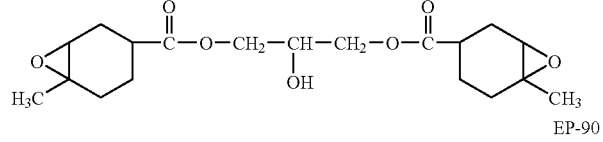 EP-89 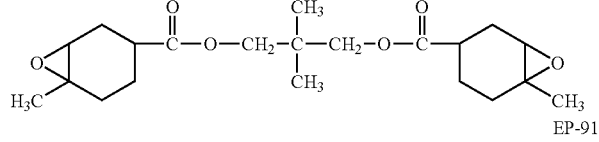
EP-90 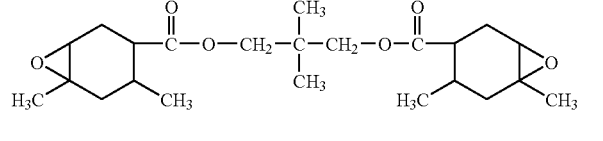 EP-91 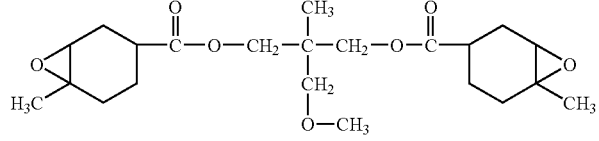
EP-92 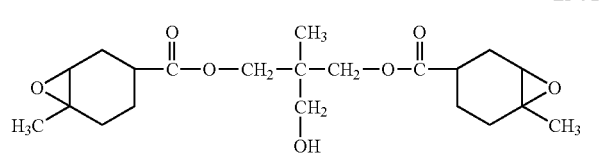 EP-93 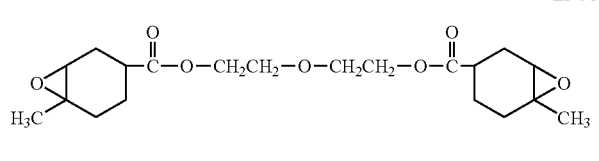

-continued
EP-94
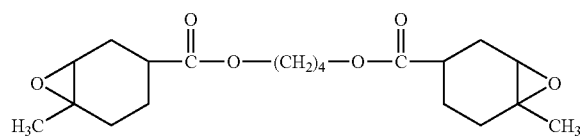
EP-95
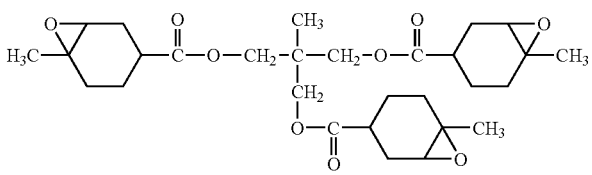
EP-96
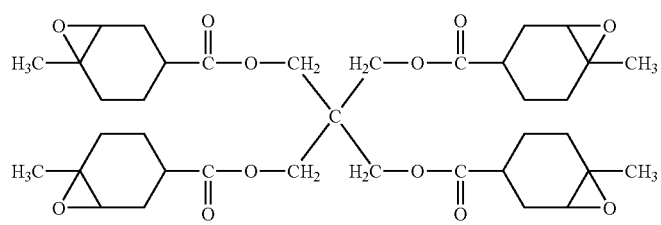
EP-97
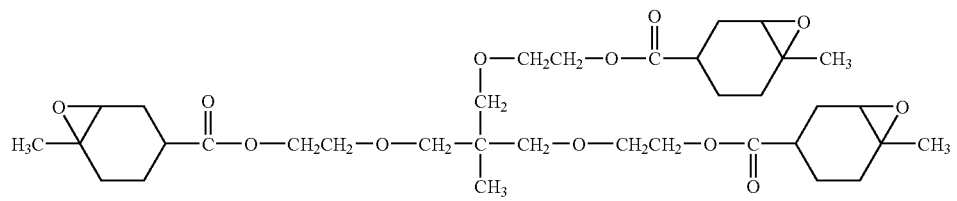
EP-98
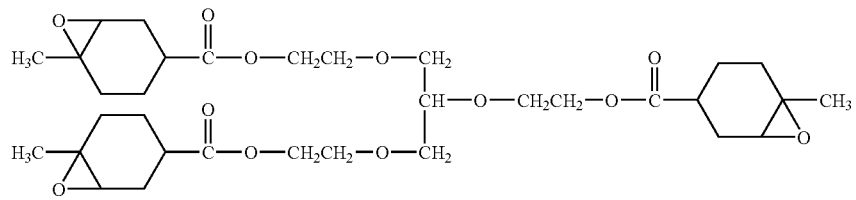
EP-99
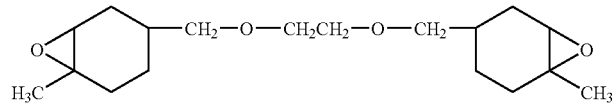
EP-100
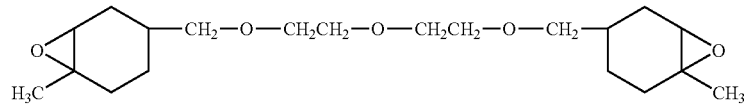
EP-101     EP-102
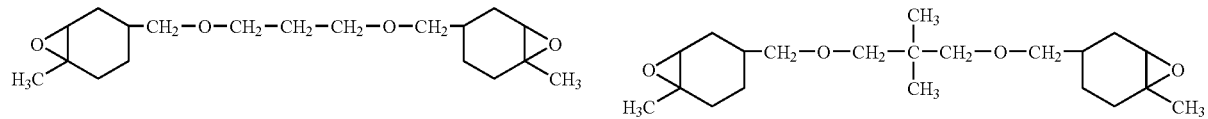
EP-103     EP-104
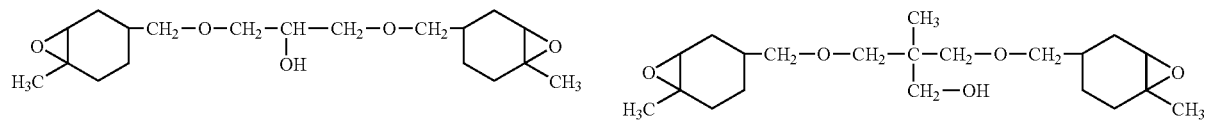
EP-105     EP-106
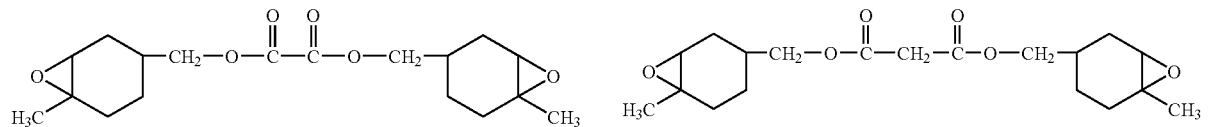

-continued
EP-107
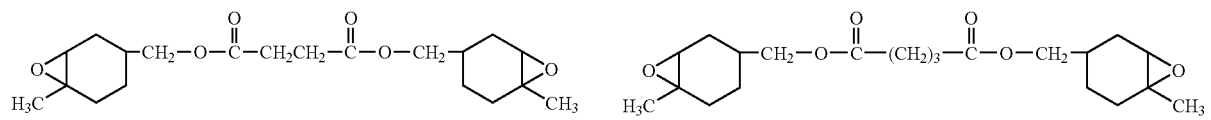
EP-108
EP-109
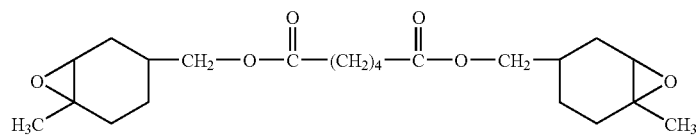
EP-110
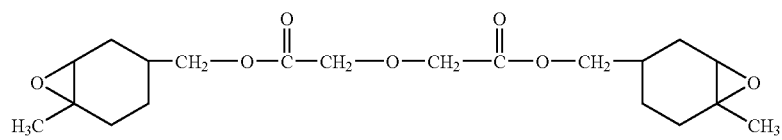
EP-111
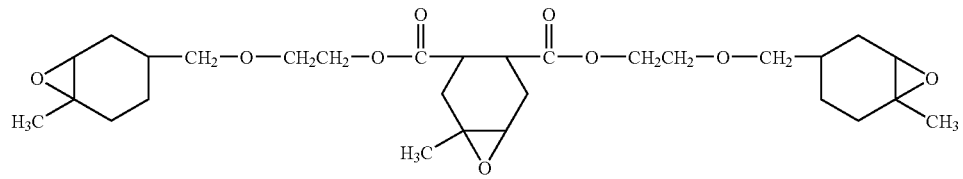
EP-112
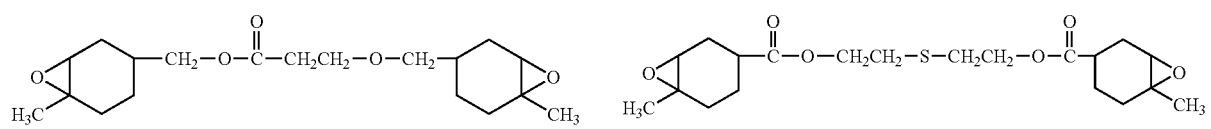
EP-113
EP-114
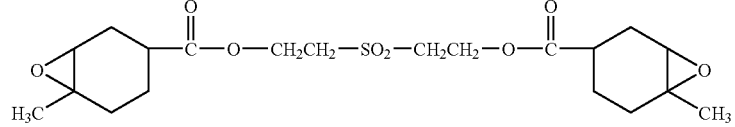
EP-115
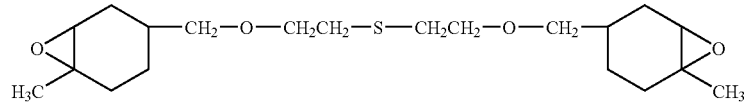
EP-116
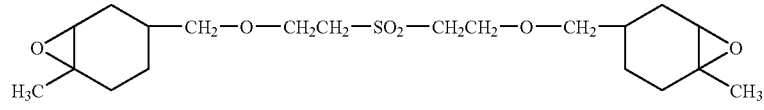
EP-117
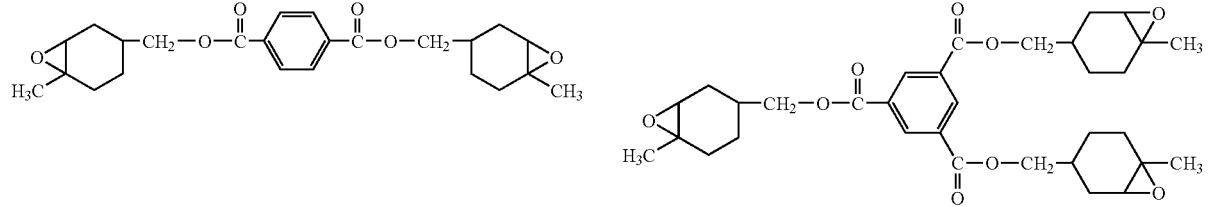
EP-118
EP-119
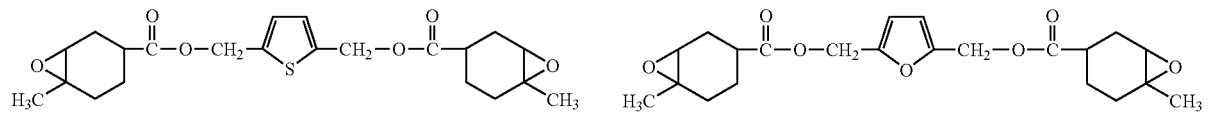
EP-120

-continued
EP-121
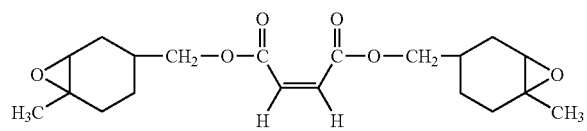
EP-122
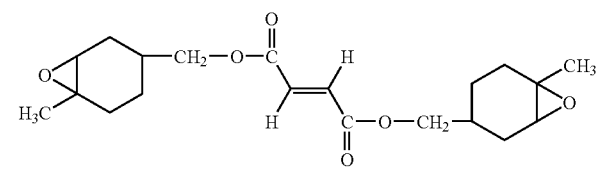
EP-123
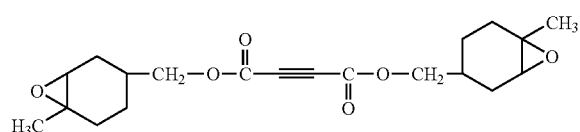
EP-124
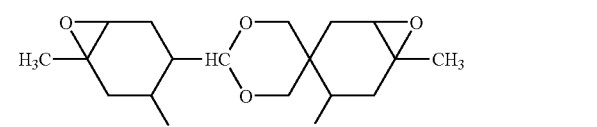
EP-125
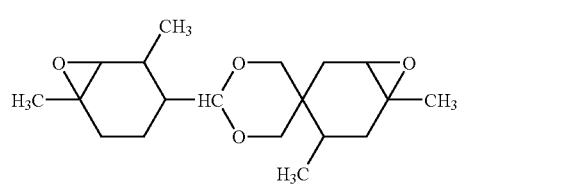
EP-126
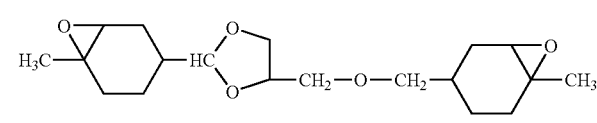
EP-127
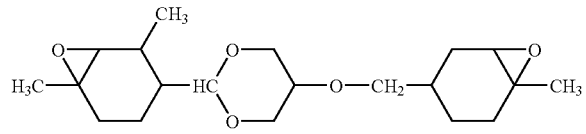
EP-128
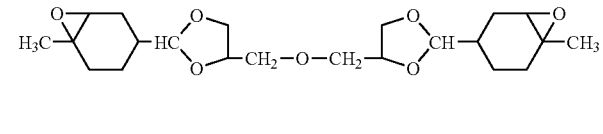
EP-129
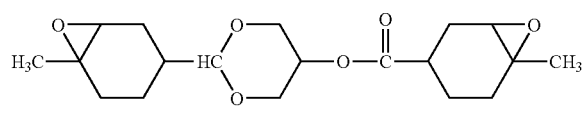
EP-130
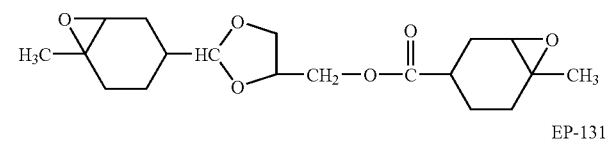
EP-131
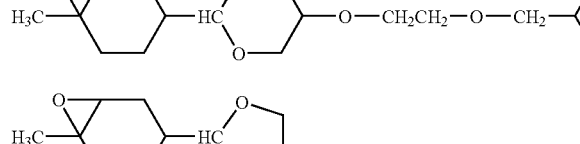
EP-132
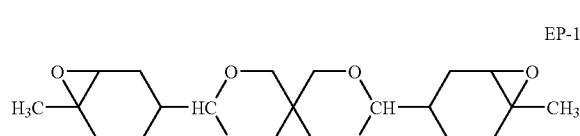
EP-133
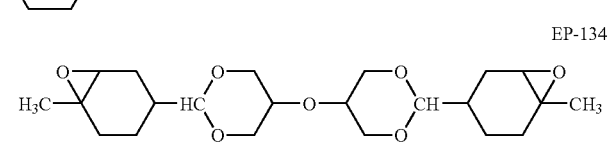
EP-134
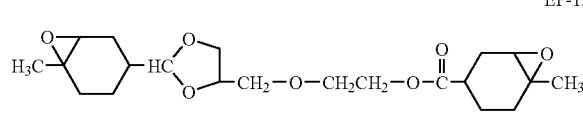
EP-135
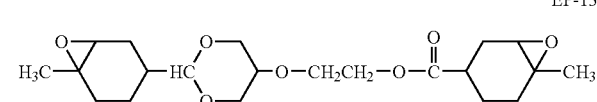
EP-136
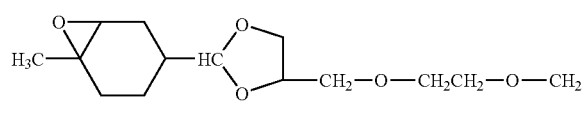
EP-137
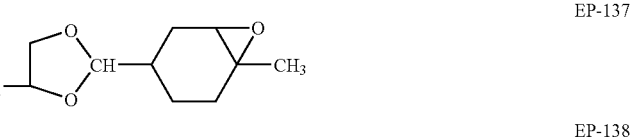
EP-138

-continued

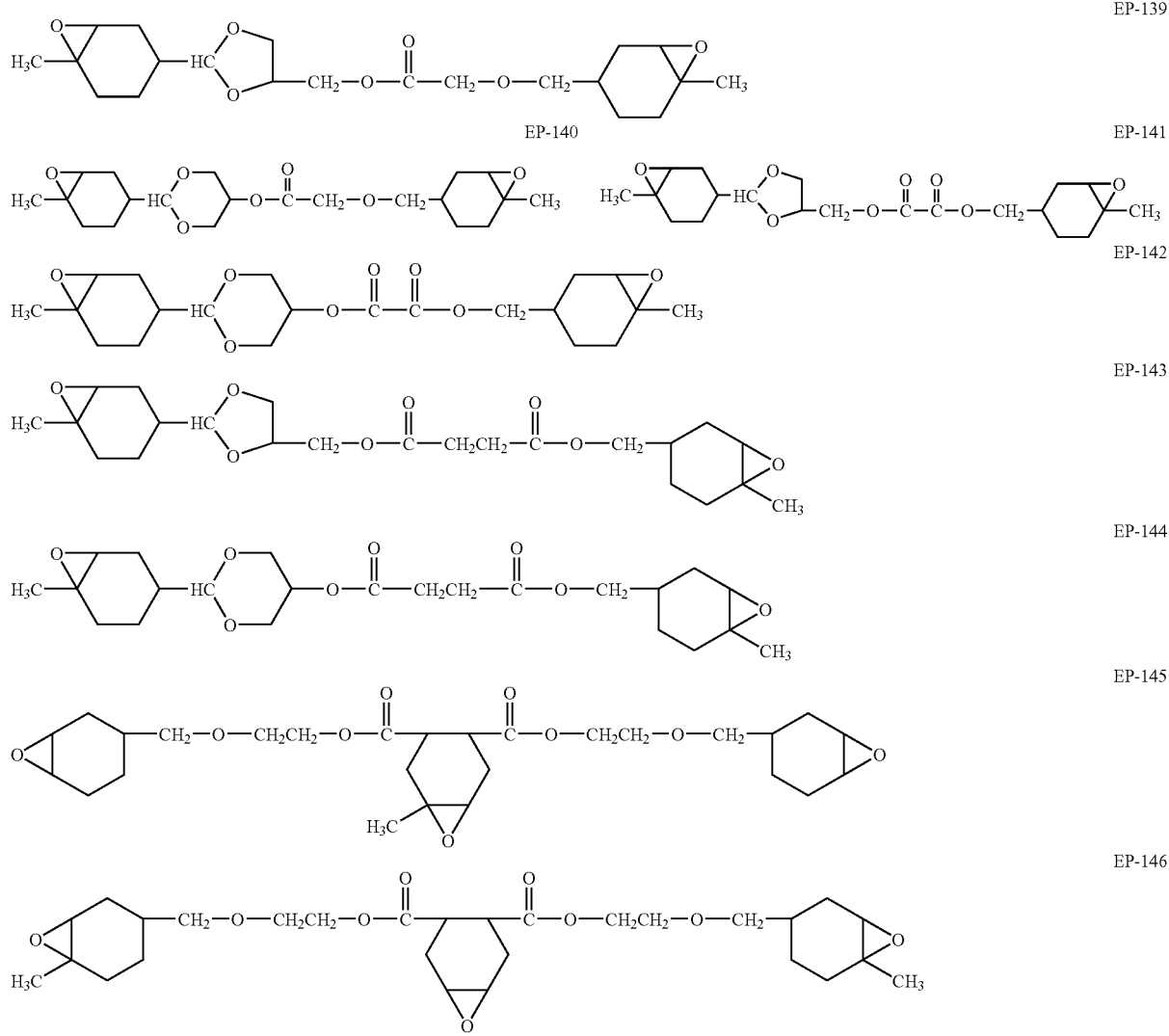

The addition amount of an epoxy compound is preferably 10-80 weight %. When it is less than 10 weight %, the curing capability significantly changes which the curing environment (being temperature and humidity) to make the composition unviable. When it is over 80 weight %, after curing the physical properties of the layer are weak, making the composition commertially unviable, while the more preferable addition amount is 20-40 weight %. In this invention, epoxy compounds may be employed either alone or in appropriate combinations of at least two types.

Further, these alicyclic epoxy compounds can be prepared irrespective of the manufacturing method, however, they may be synthesized referring to literature such as Experimental Chemistry, vol. 20, 4th edition, Organic Synthesis II, pg. 213-, (1994) published by Maruzen K. K.; The Chemistry of Heterocyclic Compounds-Small Ring Heterocycles, part 3, Oxiranes, edited by Alfred Hasfner, published by John & Wiley and Sons, An Interscience Publication, New York (1985); Yoshimura, Adhesion vol. 29, No. 12, pg. 32 (1985); Yoshimura, Adhesion vol. 30, No. 5, pg. 42 (1986); Yoshimura, Adhesion vol. 30, No. 7, pg. 42 (1986); and JP-A Nos. 11-100378, 4-36263 and 4-69360.

In the ink-jet ink of this invention, it is preferable to employ an oxetane compound without substituent at the 2-position, together with an oxetane compound represented by Formula (A) to obtain improved sensitivity or improved physical properties of the cured layer.

In the following, an oxetane compound, the 2-position of which is not substituted, will be described. Examples of oxetane compounds, the 2-position of which is not substituted, include compounds represented by following Formula (101).

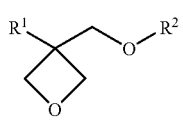

Formula (101)

In Formula (101), $R^1$ is a hydrogen atom, alkyl groups having 1-6 carbon atoms such as a methyl group, an ethyl group, a propyl group and a butyl group, fluoroalkyl groups having 1-6 carbon atoms; allyl groups, aryl groups, furyl groups or thienyl groups. $R^2$ is alkyl groups having 1-6 carbon atoms such as a methyl group, an ethyl group, a propyl group and a butyl group; alkenyl groups having 2-6 carbon atoms such as a 1-propenyl group, a 2-propenyl group, a 2-methyl-1-propenyl group, a 2-methyl-2-propenyl group, a 1-butenyl group and a 3-butenyl group; groups provided with an aromatic ring such as a phenyl group, a benzyl group, a fluorobenzyl group, a methoxybenzyl group and a phenoxyethyl group; alkylcarbonyl groups having 2-6 carbon atoms such as an ethylcarbonyl group, a propylcarbonyl group and a butylcarbonyl group; alkoxycarbonyl groups having 2-6 carbon atoms such as an ethoxycarbonyl group, a propoxycarbonyl group and a butoxycarbonyl group; or N-alkylcarbamoyl groups having 2-6 carbon atoms such as an ethylcarbamoyl group, a propylcarbamoyl group, a butylcarbamoyl group and a pentylcarbamoyl group. An oxetane compound employed in this invention is specifically preferably a compound incorporating two oxetane rings because the obtained composition exhibits superior stickiness as well as excellent working property due to the low viscosity.

Examples of compounds having two oxetane rings include compounds represented by following Formula (102).

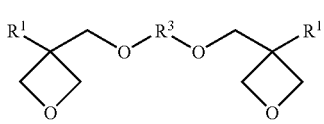

Formula (102)

In Formula (102), $R^1$ is a group similar to the one in above-described Formula (101). $R^3$ is, for example, a linear or branched alkylene group such as an ethylene group, a propylene group or a butylenes group; a linear or branched poly(alkyleneoxy) group such as an poly(ethyleneoxy) group and a poly(propyleneoxy) group; a linear or branched unsaturated hydrocarbon group such as a propenylene group, a methylpropenylene group and a butenylene group; a carbonyl group or an alkylene group containing a carbonyl group; an alkylene group containing a carboxyl group; or an alkylene group containing a carbamoyl group.

$R^3$ is also a polyvalent group selected from the groups represented by following Formulas (103), (104) and (105).

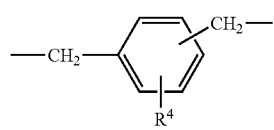

Formula (103)

In Formula (103), $R^4$ is a hydrogen atom, alkyl groups having 1-4 carbon atoms such as a methyl group, an ethyl group, a propyl group and a butyl group, alkoxy groups having 1-4 carbon atoms such as a methoxy group, an ethoxy group, a propoxy group and a butoxy group, halogen atoms such as a chlorine atom and a bromine atom, a nitro group, a cyano group, a mercapto group, a lower alkylcarboxyl group, a carboxyl group or a carbamoyl group.

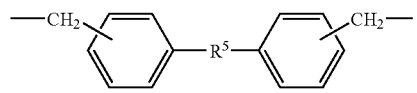

Formula (104)

In Formula (104), $R^5$ is an oxygen atom, a sulfur atom, a methylene group, NH, SO, $SO_2$, $C(CF_3)_2$ or $C(CH_3)_2$.

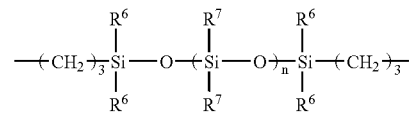

Formula (105)

In Formula (105), $R^6$ is an alkyl group having 1-4 carbon atoms such as a methyl group, an ethyl group, a propyl group and a butyl group, or aryl groups, while "n" is an integer of 0-2000. $R^7$ is an alkyl group having 1-4 carbon atoms such as a methyl group, an ethyl group, a propyl group and a butyl group, or aryl groups. $R^7$ also includes a group selected from those represented by following Formula (106).

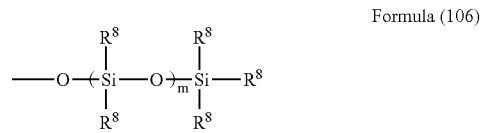

Formula (106)

In Formula (106), $R^8$ is an alkyl group having 1-4 carbon atoms such as a methyl group, an ethyl group, a propyl group and a butyl group, or aryl groups, while "m" is an integer of 0-100.

Examples of compounds provided with two oxetane rings include the following compounds.

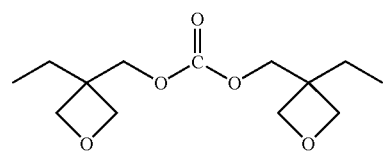

Exemplified Compound 11

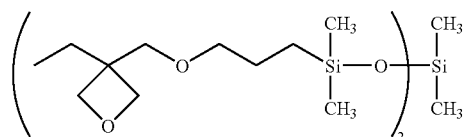

Exemplified Compound 12

Exemplified Compound 11 is represented by Formula (102), wherein $R^1$ is an ethyl group and $R^3$ is a carboxyl group. And, Exemplified Compound 12 is represented by Formula (102), wherein $R^1$ is an ethyl group and $R^3$ is represented by Formula (105) wherein $R^6$ and $R^7$ each are a methyl group and "n" is 1.

Specific examples of compounds provided with two oxetane rings include the following compounds.

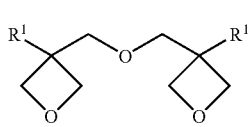
Formula (107)

In Formula (107), $R^1$ is identical to $R^1$ in foregoing Formula (101).

Further, examples of compounds provided with three to four oxetane rings include compounds represented by following Formula (108).

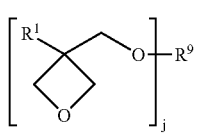
Formula (108)

In Formula (108), $R^1$ is identical to $R^1$ in foregoing Formula (101). As $R^9$, listed are a branched alkylene group having 1-12 carbon atoms such as those represented by A-C described below, a branched poly(alkyleneoxy) group such as those represented by D, also described below, or a branched polysiloxy group such as those represented by E described below as well, while "j" is 3 or 4.

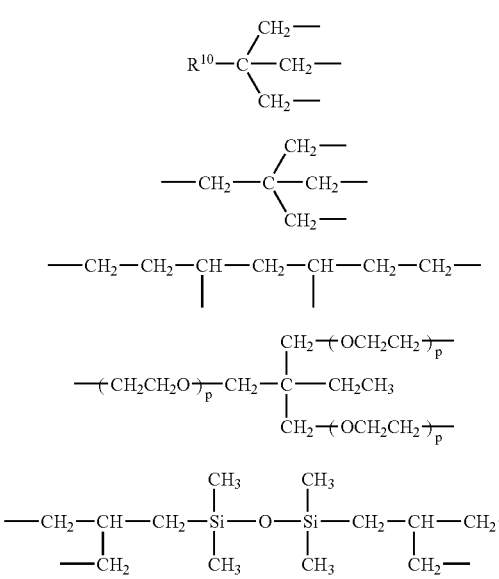

In above A, $R^{10}$ is a lower alkyl group such as a methyl group, an ethyl group or a propyl group. Further, in above D, "p" is an integer of 1-10.

Examples of compounds provided with three to four oxetane rings include Exemplified Compound 13.

Exemplified Compound 13

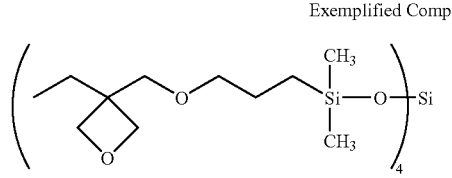

Further, examples of compounds provided with 1-4 oxetane rings other than those described above include compounds represented by following Formula (109).

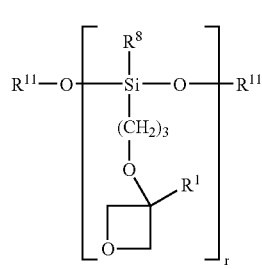
Formula (109)

In Formula (109), $R^8$ is identical to $R^8$ in foregoing Formula (106), while $R^{11}$ is an alkyl group having 1-4 carbon atoms such as a methyl group, an ethyl group, a propyl group or a butyl group, or a trialkylsilyl group, and "r" is an integer of 1-4.

Specific examples of oxetane compounds employed in this invention are shown below.

Exemplified Compound 14

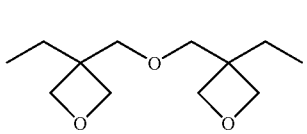

Exemplified Compound 15

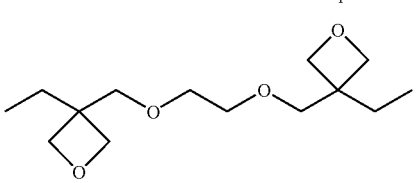

Exemplified Compound 16

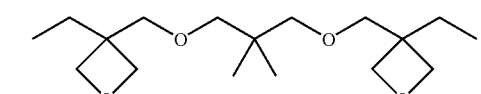

Exemplified Compound 17

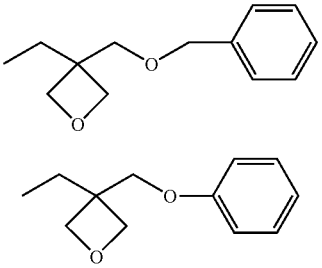

Exemplified Compound 18

Exemplified Compound 19

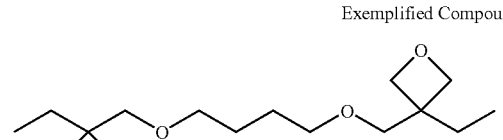

The manufacturing method of each compound provided with an oxetane ring, described above, is not specifically limited, and may follow well known conventional methods. For example, disclosed is a synthesis method in which an oxetane ring is synthesized from a diol, by D. B. Pattison in J. Am. Chem. Soc., Section 3455, pg. 79 (1957). Further, in addition to these, listed are compounds provided with 1-4 oxetane rings having a molecular weight of in as high a range as 1,000-5,000. Specific examples of these compounds include the following.

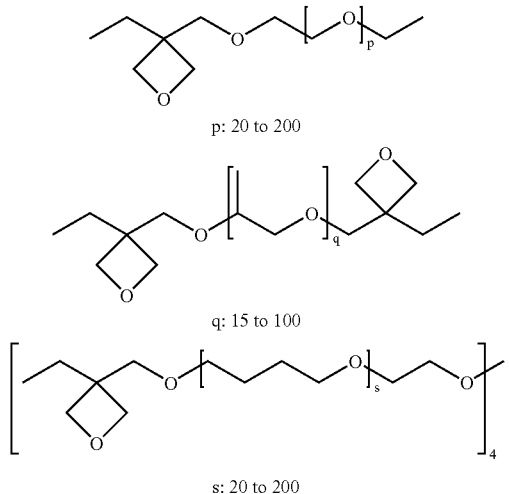

p: 20 to 200 q: 15 to 100 s: 20 to 200

In an ink-jet ink composition of this invention, a photo-induced acid generating agent is preferably incorporated together with an oxetane compound of this invention.

As a photo-induced acid generating agent employed in cationic polymerization type ink, employed, for example, are compounds which are applied for such purposes as chemically amplifying type photo-resist and photo-cationic polymerization (please refer to "Organic Materials for Imaging", pages 187-192, edited by The Research Group of Organic Electronics Materials, published by Bunshin Shyuppan (1993)). In the following paragraphs, examples compatible with this invention are listed.

Firstly, listed are $B(C_6F_5)_4^-$, $PF_6^-$, $AsF_6^-$ and $SbF_6^-$ salts; as well as sultanates such as $p\text{-}CH_3C_6H_4SO_3^-$ salt and $CF_3SO_3^-$ salt; also aromatic onium compounds such as diazonium, ammonium, iodonium, sulfonium and phosphonium.

A counter anion is preferably one having a borate compound and $PF_6^-$ salt, with respect to its high acid generating capability. Specific examples of onium compounds are shown below.

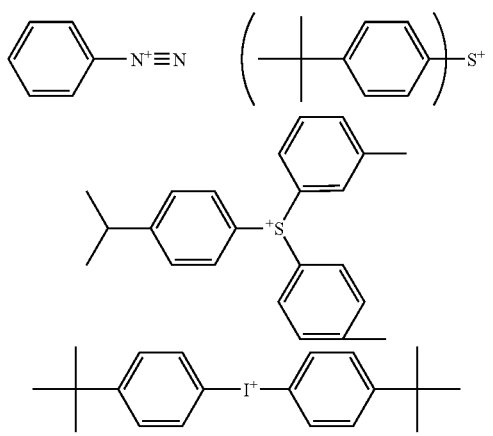

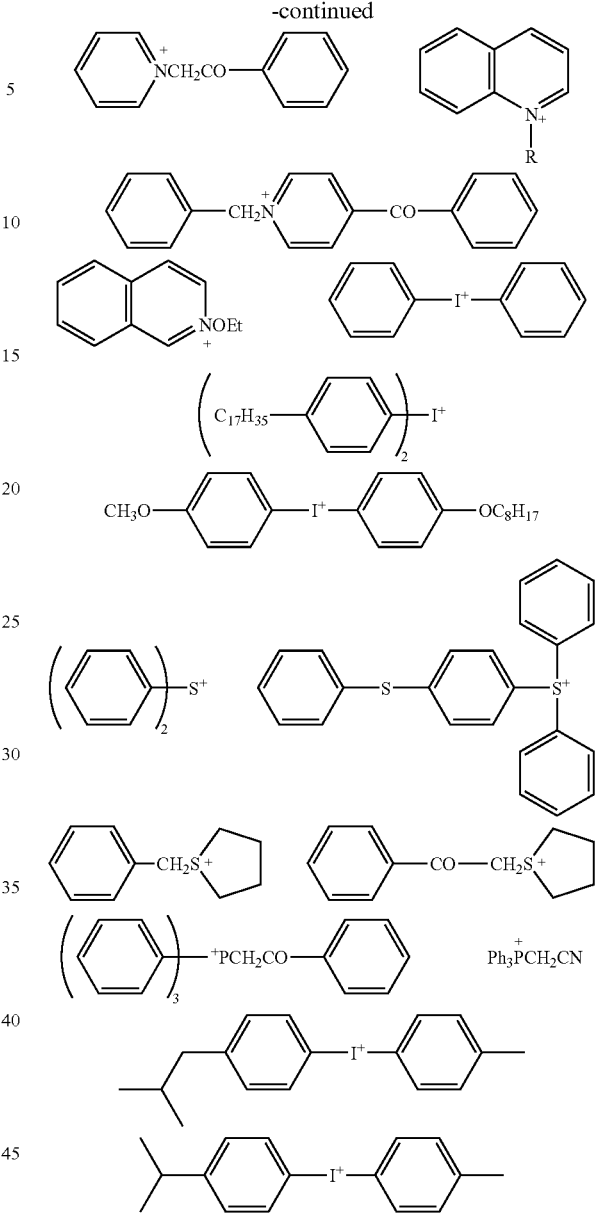

Secondly, listed are sulfonated compounds which generate sulfonic acid, specific examples of which follow.

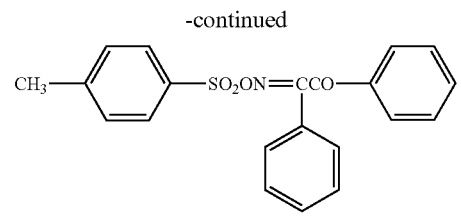

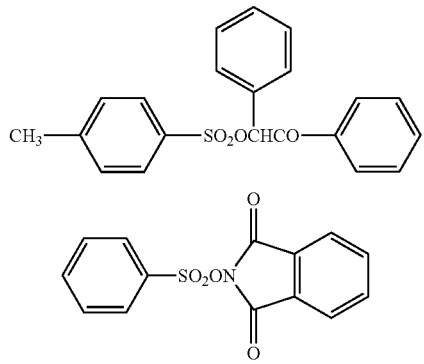

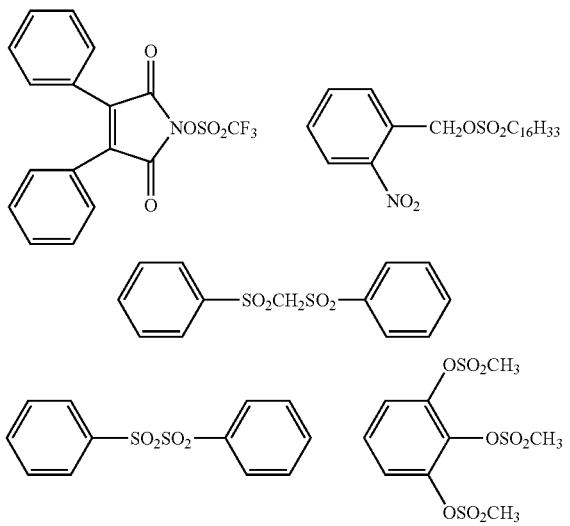

Thirdly, listed are halogenated compounds which generate hydrogen halogenide, specific examples of which follow.

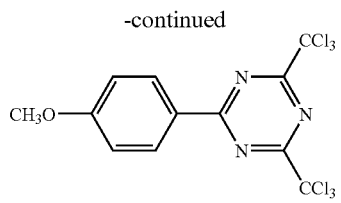

Fourthly, listed can be iron allene complexes.

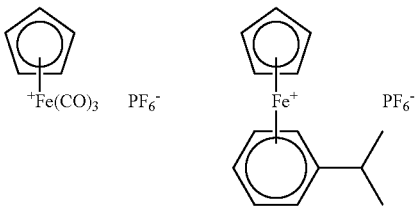

Photo-induced acid generating agents include acid generators such as aryl sulfonium derivatives (for example, Siracure UVI-6990 and Cyracure UVI-6974, manufactured by Union Carbide Corp., Adekaoptomer SP-150, Adekaoptomer SP-152, Adekaoptomer SP-170 and Adekaoptomer SP-172, manufactured by Asahi Denka Industry Co., Ltd.), allyl iodonium salt derivatives (for example, RP-2074, manufactured by Rhodia Corp.), allene-ion complex derivatives (for example, Irgacure 261, manufactured by Ciba-Geigy Corp.), diazonium salt derivatives, triazine type initiators and other halogenide compounds. A photo-induced acid generating agent is preferably incorporated at a ratio of 0.2-20 weight parts based on 100 weight parts of a compound exhibiting a cationic polymerization property. It is difficult to obtain a cured product when the content of a photo-induced acid generating agent is less than 0.2 weight parts, while further improved effects of a curing property is not expected even when the content exceeds 20 weight parts. These photo-induced acid generating agents can be utilized by selecting one or at least two types of the agents.

Photo-induced acid generating agents employable in this invention are preferably onium salts such as a sulfonium salt, an iodonium salt, an ammonium salt and a phosphonium salt, but specifically preferably are sulfonium salt compounds. Structures of the more preferable sulfonium salt compounds include sulfonium salts represented by foregoing Formulas (I-1), (I-2) and (I-3).

$R_{11}$, $R_{12}$ and $R_{13}$ in Formula (I-1) each are a substituent, and "m", "n" and "p" each are an integer of 0-2, while $X_{11}^-$ is a counter ion.

$R_{14}$ in Formula (I-2) is a substituent, while "q" is an integer of 0-2. $R_{15}$ and $R_{16}$ each are a substituted or unsubstituted alkyl group, a substituted or unsubstituted alkenyl group, a substituted or unsubstituted alkynyl group, or a substituted or unsubstituted aryl group, while $X_{12}^-$ is a counter ion.

$R_{17}$ in Formula (I-3) is a substituent, while "r" is an integer of 0-3. $R_{18}$ is a substituted or unsubstituted alkyl group, and $R_{19}$ and $R_{20}$ each are a substituted or unsubstituted alkyl group, a substituted or unsubstituted alkenyl group, a substituted or unsubstituted alkynyl group, or a substituted or unsubstituted aryl group, while $X_{13}^-$ is a counter ion.

Sulfonium salts represented by Formulas (I-1), (I-2) and (I-3) will now be described. $R_{11}$, $R_{12}$ and $R_{13}$ in Formula (I-1) each are a substituent, examples of the substituents include halogen atoms (such as a chlorine atom, a bromine atom and a fluorine atom), alkyl groups having 1-6 carbon atoms (such as a methyl group, an ethyl group, a propyl group, an iso-propyl group and a butyl group), cycloalkyl groups having 3-6 carbon atoms (such as a cyclopropyl group, a cyclobutyl group, a cyclopentyl group and a cyclohexyl group), alkenyl groups having 1-6 carbon atoms (such as a vinyl group, a 1-propenyl, a 2-propenyl group and a 2-butenyl group), alkynyl groups having 1-6 carbon atoms (such as an acetylenyl group, a 1-propynyl group, a 2-propynyl group and a 2-butynyl group), alkoxy groups having 1-6 carbon atoms (such as a methoxy group, an ethoxy group, an n-propoxy group, an iso-propoxy group, an n-butoxy group and a tert-butoxy group), alkylthio groups having 1-6 carbon atoms (such as a methylthio group, an ethylthio group, an n-propylthio group, an iso-propylthio group, an n-butylthio group and a tert-butylthio group), aryl groups having 6-14 carbon atoms (such as a phenyl group, a naphthyl group and an anthrathenyl), aryloxy groups having 6-10 carbon atoms (such as a phenoxy group and a naphthoxy group), arylthio groups having 6-10 carbon atoms (such as a phenythio and a naphthylthio group), acyl groups (such as an acetyl, a propionyl group, a trifluoroacetyl group and benzoyl group), acyloxy groups (such as an acetoxy group, a propionyloxy group, a trifluoroacetoxy group and a benzoyloxy group), alkoxycarbonyl groups (such as a methoxycarbonyl group, an ethoxycarbonyl group and a tert-butoxycarbonyl), hetero atom-containing aromatic ring groups having 4-8 carbon atoms (such as a furyl group and a thienyl group), a nitro group and a cyano group.

Preferable substituents are halogen atoms, alkyl groups, alkyloxy groups, aryl groups, aryloxy groups, arylthio groups and acyl groups. These substituents may be further substituted when it is possible. "m", "n" and "p" each are an integer of 0-2, but each is preferably not less than 1. $X_{11}^-$ is a counter ion, including complex ions such as $BF_4^-$, $B(C_6F_5)_4^-$, $PF_6^-$, $AsF_6^-$ and $SbF_6^-$, as well as sulfonate ions such as $p\text{-}CH_3C_6H_4SO_3^-$ and $CF_3SO_3^-$. A counter ion is preferably a borate ion or $PF_6^-$, with respect to its high acid generating capability.

$R_{14}$ in Formula (I-2) is a substituent, examples of which include halogen atoms (such as a chlorine atom, a bromine atom and a fluorine atom), alkyl groups having 1-6 carbon atoms (such as a methyl group, an ethyl group, a propyl group, an iso-propyl group and a butyl group), cycloalkyl groups having 3-6 carbon atoms (such as a cyclopropyl group, a cyclobutyl group, a cyclopentyl group and a cyclohexyl group), alkenyl groups having 1-6 carbon atoms-(such as a vinyl group, a 1-propenyl group and a 2-butenyl group), alkynyl groups having 1-6 carbon atoms (such as an acetylenyl group, a 1-propynyl group, a 2-propynyl group and a 2-butynyl group), alkoxy groups having 1-6 carbon atoms (such as a methoxy group, an ethoxy group, an n-propoxy group, an iso-propoxy group, an n-butoxy group and a tert-butoxy group), alkylthio groups having 1-6 carbon atoms (such as a methylthio group, an ethylthio group, an n-propylthio group, an iso-propylthio group, an n-butylthio group and a tert-butylthio group), aryl groups having 6-14 carbon atoms (such as a phenyl group, a naphthyl group and an anthrathenyl group), aryloxy groups having 6-10 carbon atoms (such as a phenoxy group and a naphthoxy group), arylthio groups having 6-10 carbon atoms (such as a phenythio group and a naphthylthio group), acyl groups (such as an acetyl, a propionyl group, a trifluoroacetyl group and benzoyl group), acyloxy groups (such as an acetoxy group, propionyloxy group, a trifluoroacetoxy group and a benzoyloxy group), alkoxycarbonyl groups (such as a methoxycarbonyl group, an ethoxycarbonyl group and a tert-butoxycarbonyl group), hetero atom-containing aromatic ring groups having 4-8 carbon atoms (such as a furyl group and a thienyl group), a nitro group and a cyano group. Preferable substituents are halogen atoms, alkyl groups, aryl groups, alkoxy groups and aryloxy groups. These substituents may further be substituted when it is possible. "q" is an integer of 0-2, preferably not less than 1 but more preferably 2.

$R_{15}$ and $R_{16}$ each are preferably a substituted or unsubstituted alkyl group, or a substituted or unsubstituted aryl group; and the substituent is preferably a halogen atom, an alkyl group, an alkoxy group, an aryl group, an aryloxy group or a hydroxyl group.

$X_{12}^-$ is a counter ion, which includes complex ions such as $BF_4^-$, $B(C_6F_5)_4^-$, $PF_6^-$, $AsF_6^-$ and $SbF_6^-$, and sulfonate ions such as $p\text{-}CH_3C_6H_4SO_3^-$ and $CF_3SO_3^-$. Counter ions are preferably a borate ion and $PF_6^-$, with respect to their high acid generating capability.

$R_{17}$ in Formula (I-3) is a substituent, examples of which include a halogen atom (such as a chlorine atom, a bromine atom and a fluorine atom), alkyl groups having 1-6 carbon atoms-(such as a methyl group, an ethyl group, a propyl-group, an iso-propyl group and a butyl group), cycloalkyl groups having 3-6 carbon atoms (such as a cyclopropyl group, a cyclobutyl group, a cyclopentyl group and a cyclohexyl group), alkenyl groups having 1-6 carbon atoms (such as a vinyl group, a 1-propenyl group and a 2-butenyl group), alkynyl groups having 1-6 carbon atoms (such as an acetylenyl group, a 1-propynyl group, a 2-propynyl group and a 2-butynyl group), alkoxy groups having 1-6 carbon atoms (such as a methoxy group, an ethoxy group, an n-propoxy group, an iso-propoxy group, an n-butoxy group and a tert-butoxy group), aryl groups having 6-14 carbon atoms-(such as a phenyl group, a naphthyl group and an anthrathenyl group), aryloxy groups having 6-10 carbon atoms (such as a phenoxy group and a naphthoxy group), acyl groups (such as an acetyl group, a propionyl group, a trifluoroacetyl group and benzoyl group), acyloxy groups (such as an acetoxy group, a propionyloxy group, a trifluoroacetoxy group and a benzoyloxy group), alkoxycarbonyl groups (such as a methoxycarbonyl group, an ethoxycarbonyl group and a tert-butoxycarbonyl group), aryl groups having 6-10 carbon atoms (such as a phenyl group, a naphthyl group and an anthrathenyl group), hetero atom-incorporating aromatic ring groups having 4-8 carbon atoms (such as a furyl group and a thienyl group), as well as a nitro group and a cyano group. Preferable substituents are halogen atoms, alkyl groups, aryl groups, alkoxy groups and aryloxy groups. Preferable substituents are a halogen atom, an alkyl group, an alkoxy group, an aryl group, an aryloxy group and an acyl group. "r" is an integer of 0-3, preferably not less than 1 but more preferably 2.

$R_{18}$ is a hydrogen atom or a substituted or unsubstituted alkyl group, while $R_{19}$ and $R_{20}$ each are a substituted or unsubstituted alkyl group, a substituted or unsubstituted alkenyl group, a substituted or unsubstituted alkynyl group, or a substituted or unsubstituted aryl group. Examples of these substituents include a halogen atom (such as a chlorine atom, a bromine atom and a fluorine atom), an alkyl group having 1-6 carbon atoms (such as a methyl group, an ethyl group, a propyl group, an iso-propyl group and a butyl group), cycloalkyl groups having 3-6 carbon atoms (such as a cyclopropyl group, a cyclobutyl group, a cyclopentyl group and a cyclohexyl group), an alkenyl group having 1-6 carbon atoms (such as a vinyl group, a 1-propenyl group and a 2-butenyl group), an alkynyl group having 1-6 carbon atoms (such as an acetylenyl group, a 1-propynyl group, a 2-propynyl group and a 2-butynyl group), an alkoxy group having 1-6 carbon atoms (such as a methoxy group, an ethoxy group, an n-propoxy group, an iso-propoxy group, an n-butoxy group and a tert-butoxy group), an aryl group having 6-14 carbon atoms (such as a phenyl group, a naphthyl group and an anthrathenyl group), an acyl group (such as an acetyl group, a propionyl group, a trifluoroacetyl group and a benzoyl group), an acyloxy group (such as an acetoxy group, a propionyloxy group, a trifluoroacetoxy group and a benzoyloxy), an alkoxycarbonyl group (such as a methoxycarbonyl group, an ethoxycarbonyl group and a tert-butoxycarbonyl group), a hetero atom-incorporating aromatic ring group having 4-8 carbon atoms (such as a furyl group and a thienyl group), in addition to a nitro group and a cyano group. Preferable substituents are a halogen atom, an alkyl group, an aryl group, an alkoxy group, an aryloxy group and an acyl group.

$R_{18}$ preferably is a hydrogen atom or an unsubstituted lower alkyl group (such as a methyl group, an ethyl group and a propyl group), $R_{19}$ and $R_{20}$ each are preferably a substituted or unsubstituted alkyl group, or a substituted or unsubstituted aryl group which are preferably a halogen atom, an alkyl group, an alkoxy group, an aryl group, an aryloxy group or an acyl group. $X_{13}^-$ counter ion, which include complex ions such as $BF_4^-$, $B(C_6F_5)_4^-$, $PF_6^-$, $AsF_6^-$ and $SbF_6^-$, and sulfonate ions such as p-$CH_3C_6H_4SO_3^-$ and $CF_3SO_3^-$. The counter ion is preferably a borate ion or $PF_6^-$, due to its high acid generating capability.

In the following pages, specific examples of sulfonium compounds represented by Formulas (I-1), (I-2) and (I-3) will be shown, however, this invention is not limited thereto.

PI-1

PI-2

PI-3

PI-4
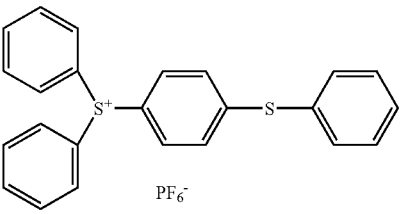

PI-5
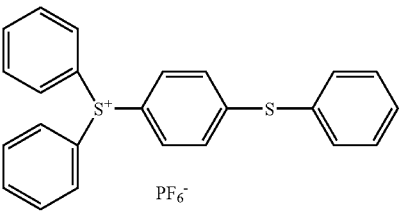

PI-6
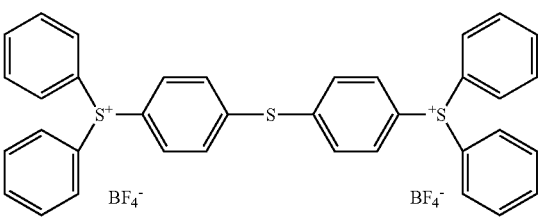

PI-7
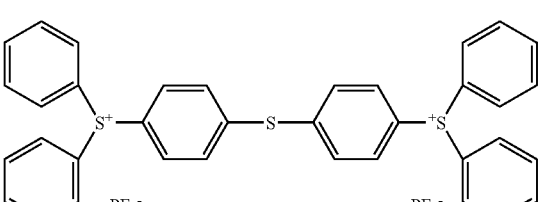

PI-8
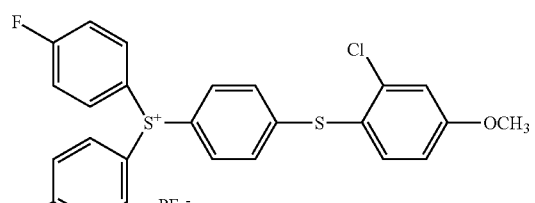

PI-9
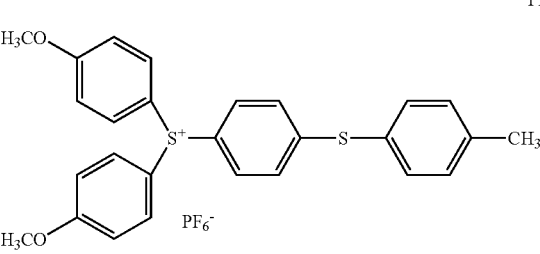

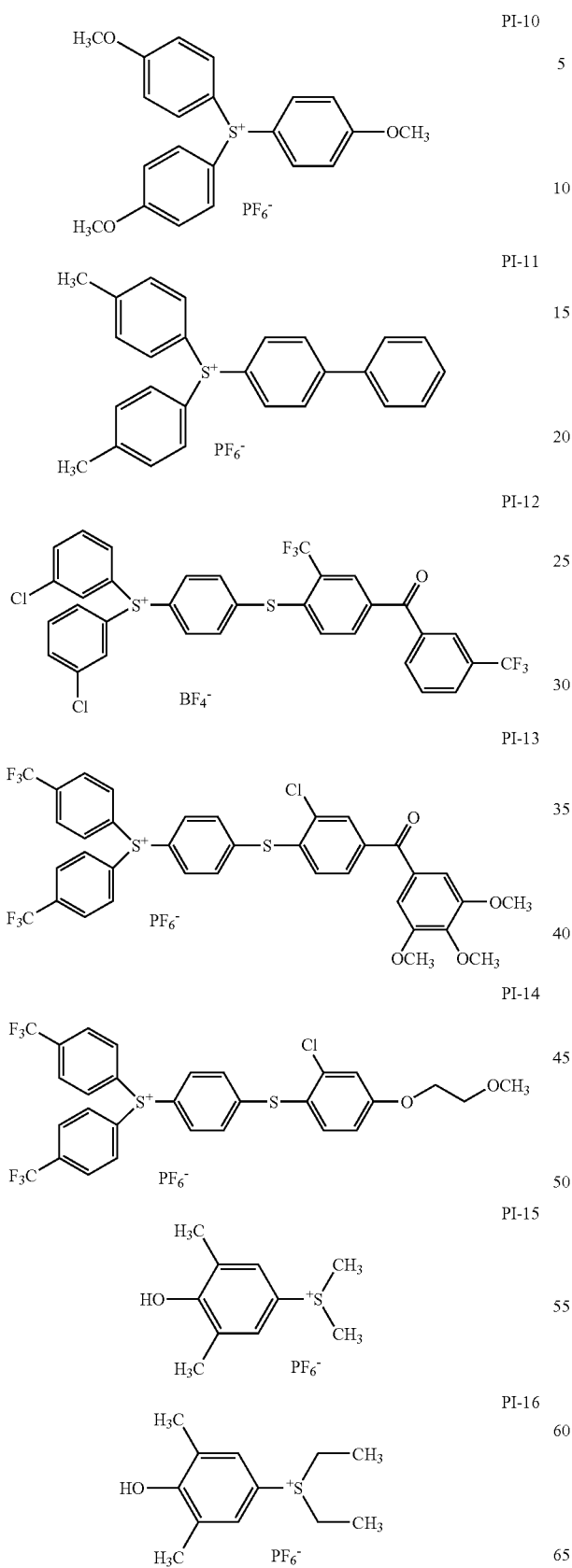

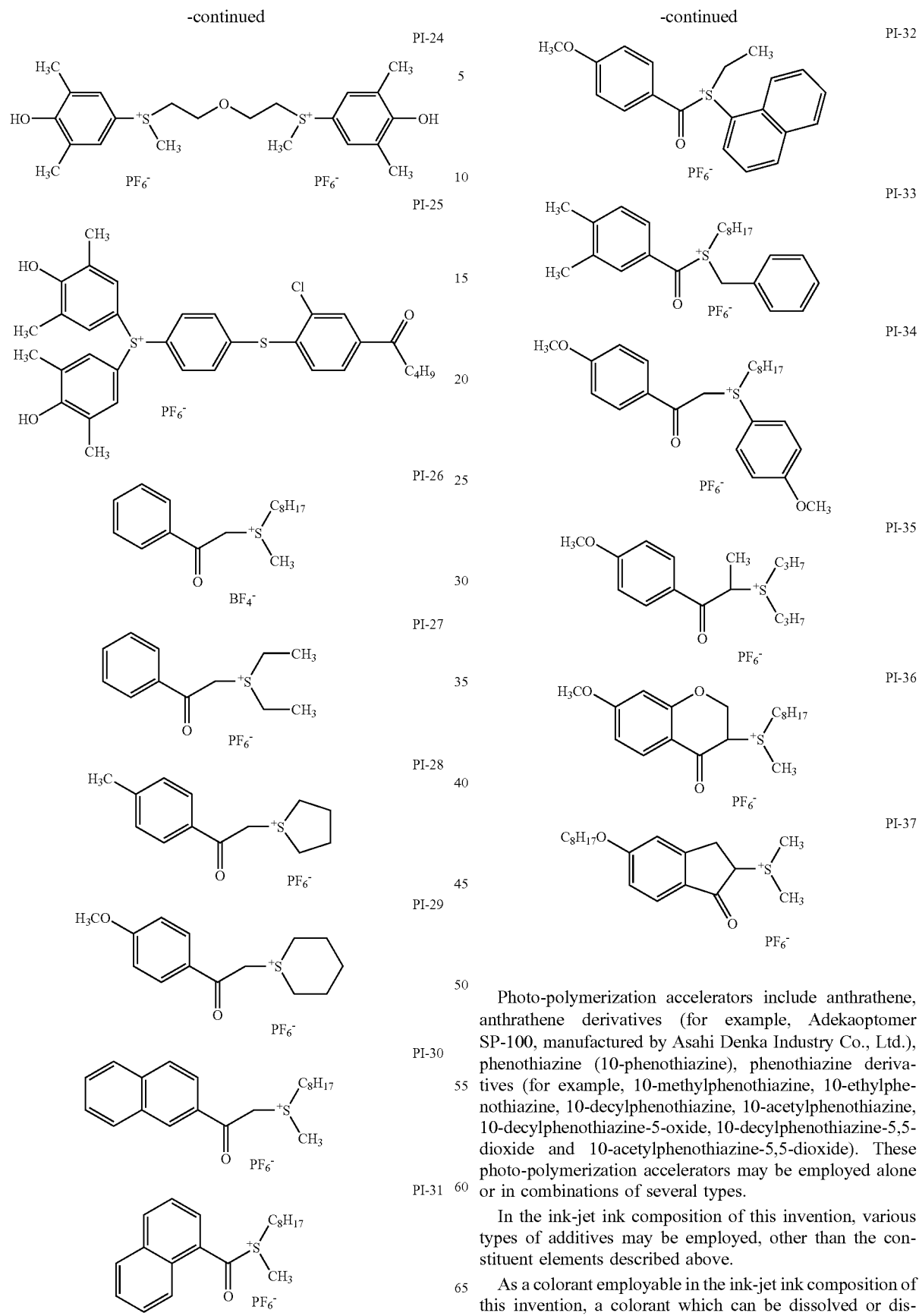

Photo-polymerization accelerators include anthrathene, anthrathene derivatives (for example, Adekaoptomer SP-100, manufactured by Asahi Denka Industry Co., Ltd.), phenothiazine (10-phenothiazine), phenothiazine derivatives (for example, 10-methylphenothiazine, 10-ethylphenothiazine, 10-decylphenothiazine, 10-acetylphenothiazine, 10-decylphenothiazine-5-oxide, 10-decylphenothiazine-5,5-dioxide and 10-acetylphenothiazine-5,5-dioxide). These photo-polymerization accelerators may be employed alone or in combinations of several types.

In the ink-jet ink composition of this invention, various types of additives may be employed, other than the constituent elements described above.

As a colorant employable in the ink-jet ink composition of this invention, a colorant which can be dissolved or dispersed in the primary component of a polymerization compound may be employed, however; pigments are preferred due to their weather resistance.

Pigments preferably employable in this invention are listed below.

C. I. Pigment Yellow-1, 3, 12, 13, 14, 17, 81, 83, 87, 95, 109 and 42

C. I. Pigment Orange-16, 36 and 38

C. I. Pigment Red-5, 22, 38, 48:1, 48:2, 48:4, 49:1, 53:1, 57:1, 63:1, 144, 146, 185 and 101

C. I. Pigment Violet-19 and 23

C. I. Pigment Blue-15:1, 15:3, 15:4, 18, 27, 29 and 60

C. I. Pigment Green-7 and 36

C. I. Pigment White-6, 18 and 21, and,

C. I. Pigment Black-7

For dispersion of above pigments, employed may be such devices as a ball mill, an atleiter, a roll mill, an agitator, a Henchel Mixer, a colloidal mill, an ultrasonic homogenizer, a pearl mill, a wet type jet mill or a common paint shaker. A dispersant may also be added at the time of dispersion of the pigment. The dispersant is preferably a polymer dispersant, an example of which includes the Solsperese Series manufactured by Avecia Corp. Further, as a dispersion aid, utilized may be synergists corresponding to various types of pigments. These dispersant and dispersion aids are preferably added at 1-50 weight parts based on 100 weight parts of pigment. A solvent or a polymerization compound is utilized as a dispersion medium, however, solvents are not preferred in active ray curable ink utilized in this invention to perform the reaction curing immediately after ink deposition. When a solvent remains in a cured image, raised are problems of deterioration of solvent resistance and VOC of the residual solvent. Therefore, a dispersion medium, preferably a polymerization compound, and, in particular, preferable is to select a monomer having the lowest viscosity with respect to dispersion adaptability.

In dispersion of a pigment, the average particle diameter of pigment particles is preferably 0.08-0.5 μm, and the maximum particle diameter is 0.3-10 μm and preferably 0.3-3 μm by selection of specific pigments, a dispersant and a dispersion medium, and suitable setting of dispersion and filtration conditions. By such particle size control, it is possible to reduce clogging of head nozzles, as well as to maintain storage stability, transparency and curing sensitivity of the ink.

In the ink-jet ink composition of this invention, the colorant concentration is preferably 1-10 weight % based on the total ink weight %.

In this invention, a thermal base generating agent may also be employed to improve ejection stability and storage stability.

As a thermal base generating agent, preferably employed are, for example, a salt of an organic acid and a base, which decomposes by decarboxylation with heating, a compound which decomposes to release amines via an intra-molecular nucleophilic substitution reaction, reactions such as Lossen rearrangement and Beckmann rearrangement, and those agents causing a some reaction with heat to release a base. Specifically useful are, a salt of trichloroactate described in BP No. 998,949, a salt of α-sulfonylacetate described in U.S. Pat. No. 4,060,420, a salt of propiolic acids described in JP-A 59-157637, 2-carboxycarboxamide derivatives, a salt incorporating a thermally decomposing acid employing an alkali metal or alkaline earth metal in addition to an organic base as a base component, described in JP-A 59-168440; hydroxame carbamates utilizing Lossen rearrangement described in JP-A 59-180537, and aldoxime carbamates which generate nitrile via heating described in JP-A 59-195237. In addition to these, useful are thermal base generating agents described in BP No. 998,945, U.S. Pat. No. 3,220,846, BP No. 279,480, JP-A Nos. 50-22625, 61-32844, 61-51139, 61-52638, 61-51140, 61-53634, 61-53640, 61-55644 and 61-55645.

Further, specific examples of thermal base generating agents include, guanidine trichloroacetate, methylguanidine trichloroacetate, potassium trichloroacetate, guanidine phenylsulfonylacetate, guanidine p-chlorophenylsulfonylacetate, guanidine p-methanesulfonylphenylsulfonylacetate, potassium phenylpropiolate, guanidine phenylpropiolate, cesium phenylpropiolate, guanidine p-chlorophenylpropiolate, guanidine p-phenylene-bisphenylpropiolate, tetramethylammonium phenylsulfonylacetate and tetramethylammonium phenylsulfonylpropiolate. The thermal base generating agents described above may be employed at a broad range of addition amount.

An ink-jet ink composition of this invention may contain acid multiplying agents, which newly generate an acid via an acid generated by irradiation of active rays, which are disclosed in such as JP-A Nos. 8-248561 and 9-34106, but are also commonly known in the art.

The ink-jet ink composition of this invention is manufactured by appropriately dispersing pigment in addition to an active ray curable compound and a pigment dispersant via an ordinary homogenizer such as a sand mill. It is preferable to prepare in advance a highly concentrated solution of pigment and which is diluted with an active ray curable compound. Since sufficient dispersion is possible with ordinary homogenizers, negating excess dispersion energy, nor is much dispersion time required, whereby barely modifying ink components at the time of dispersion, resulting in preparation of ink exhibiting excellent overall stability. Ink is preferably filtered employing at least 3 μm, followed by filtering with one of at most 1 μm.

The viscosity of the ink-jet ink composition of this invention is preferably adjusted to be as high as 5-50 mPa·s at 25° C. Ink exhibiting a viscosity of 5-50 mPa·s at 25° C. exhibits stable ejection characteristics, especially with a head provided with a common frequency of 4-10 kHz, as well as with a head driven by a frequency of as high as 10-50 kHz. When the viscosity is less than 5 mPa·s, deterioration of ejection following property at high frequency is observed, while when the viscosity is over 50 mPa·s, deterioration of ejection follows even with a viscosity lowering mechanism such as heating the head, resulting from unstable to no ejection.

Further, the ink-jet ink composition of this invention, when applied in a piezo head, is preferably provided with an electrical conductivity of not more than 10 μS/cm, so as to eliminate electrical corrosion inside the head. Further, in the case of continuous type ejection, electrical conductivity adjustment via an electrolyte is necessary and the electric conductivity needs to be adjusted to at least 0.5 mS/cm.

In this invention, the surface tension at 25° C. of ink is preferably in a range of 25-40 mN/m. Stable ejection is infrequent when the surface tension at 25° C. of ink is less than 25 mN/m, while the desired dot diameter can not be obtained when it is over 40 mN/m. Beyond the range of 25-40 mN/m, it is difficult to obtain uniform dot diameter even when ejection and light irradiation are performed while controlling such parameters as viscosity and water content of ink on various substrates.

To adjust the surface tension, a surface active agent may be appropriately incorporated. Surface active agents utilized in this invention include, for example, anion surface active agents such as dialkylsuccinates, alkylnaphthalenesulfonates and fatty acid salts, nonion surface active agents such as polyoxyethylene alkylethers, polyoxyethylene alkylallylethers, acetyleneglycols, polyoxyethylene-polyoxypropylene block copolymers, cationic surface active agents such as alkylamine salts and quarternary ammonium salts, and surface active agents provided with a polymerizing group. Of these, particularly, preferable are surface active compounds provided with an polymerizing group such as an unsaturated bond, oxirane and oxetane rings, such as silicone modified acrylate, fluorine modified acrylate, silicone modified epoxy, fluorine modified epoxy, silicone modified oxetane and fluorine modified oxetane.

In the ink-jet ink composition of this invention, various additives other than those described above may be employed. For example, added may be a leveling additive, a matting agent, polyester type resin, polyurethane type resin, vinyl type resin, acryl type resin, rubber type resin and waxes, which adjust physical film properties. It is also effective to add a very tiny amount of an organic solvent to improve adhesion to the recording medium. In this case, addition in a range of promoting solvent resistance and of VOC is effective and the used amount is in the range of 0.1-5.0% but preferably 0.1-3.0%. Further, it is also possible to make a hybrid type ink of radical-cation by combining a radical polymerization monomer and an initiator.

In an image forming method of this invention, the ink composition is ejected and deposited on a recording material by an ink-jet recording method, and ink is subsequently cured via irradiation of active rays, such as ultraviolet rays.

In an image forming method of this invention, it is preferable to make a liquid ink be of low viscosity at the time of ejection by heating ink simultaneously with the ink-jet nozzle, at a temperature range of 30-80° C. but preferably 35-60° C.

In this invention, the total deposited ink layer thickness is preferably 2-20 μm, after curing via active ray irradiation. Via active ray curable ink-jet recording in a screen printing application, the total ink layer thickness is presently over 20 μm, however, it is not feasible in soft package printing applications in which a recording material is often a thin plastic material since it causes problems such as stiffness, and texture of the whole printed matter material may also cause significant problems of curling and wrinkling of the such recoding material. Further, in this invention, the volume of droplets ejected from the nozzles is preferably 2-15 pl.

In this invention, timing of irradiation is preferably as soon as possible to form highly precise images, however, irradiation is preferably started only after viscosity or water-content of the ink becomes optional.

More specifically, the irradiation condition of active rays is preferably started 0.001-2.0 second after ink deposition but more preferably 0.001-0.4 second. Further, irradiation is preferably terminated after loss of fluidity of the ink 0.1-3.0 seconds but preferably in 0.2-1.0 second. By setting the above conditions, spreading of dot diameter or bleeding of dots can be prevented.

As an active ray irradiation method, disclosed is the fundamental method in JP-A 60-132767. Based on that invention, light sources are arranged on the both sides of a recording head unit, and a recording head and a light source scan via a shuttle means. Irradiation is performed after a certain time interval following ink deposition. Further, curing is accomplished by a separate undriven light source. In U.S. Pat. No. 6,145,979, disclosed are irradiation methods which employ optical fibers, collimated light directed onto a mirrored surface provided on the recording head unit side and UV light irradiated onto the recording medium. In an image forming method of this invention, any of these irradiation methods may be employed.

Further, a preferable embodiment is a method in which active ray irradiation is divided into two steps, whereby active rays are firstly irradiated according to the foregoing method 0.001-2.0 seconds after ink deposition, followed by further irradiation of active rays after the entire sheet is printed. Thereby it is possible to reduce shrinkage of the recording sheet caused at the time of ink curing by dividing active ray irradiation into two steps.

Examples of light sources employed inactive ray irradiation include such as a mercury arc lamp, a xenon arc lamp, a fluorescent lamp, a carbon arc lamp, a tungsten-halogen copy lamp, a high pressure mercury lamp, a metal halide lamp, an electrodeless UV lamp, a low pressure mercury lamp, a UV laser, a xenon flash tube, a light trap lamp, a black light, a sterilizing lamp, a cold cathode tube and an LED, however, this is not an exclusive list. Of these, the fluorescent lamp is preferred due to low energy consumption and a low initial cost. The peak emission wavelength of light source is 270-370 nm but preferably 270-320 nm, with respect to sensitivity. The illuminance is commonly 1-3,000 mW/cm$^2$ but preferably 1-200 mW/cm$^2$. Further, in the case of curing by electron rays, curing is generally performed at an energy of at most 300 eV, however, almost instantaneous curing is also possible at an irradiation energy of 1-5 Mrad.

Image printing performed on a recording medium (also referred to as a substrate) via the ink-jet ink composition of this invention, a recording medium may be any of a variety of synthetic resins, which have been conventionally employed for various purposes, but specifically include such as polyester, polyvinyl chloride, polyethylene, polyurethane, polypropylene, acrylic resin, polycarbonate, polystyrene, an acrylonitrile-butadiene-styrene copolymer, polyethylene-terephthalate and polybutadieneterephthalate. The thickness and a shape of these resin substrates is basically not limited.

As a substrate employable in this invention, employed may be a non-absorptive substrate in addition to ordinary coated and non-coated paper, but non-absorptive substrates among these is preferably employed.

As a non-absorptive substrate in this invention, employed may be various types of non-absorptive plastic and films thereof, and various types of such plastic films include, for example, PET film, OPS film, OPP film, ONy film, PVC film, PE film and TAC film. As other plastics, polycarbonate, acrylic resin, ABS, polyacetal, PVA and various types of rubber may be employed. Further, metals and glasses are also applicable. The composition of this invention is effective in forming images on PET film, OPS film, OPP film, ONy film and PVC film, which shrink upon heat. In these substrates, curling and deformation of film are common due to curing and shrinkage of the ink, or heat at the time of the curing reaction, and the ink layer shrinkage is not compatible with shrinkage of the substrate.

The surface energy of each type of plastic film described above significantly differs from each other, having been a major problem, in that a dot diameter after deposition will vary depending on the recording medium. Although OPP film at a low surface energy, as well as OPS film at a relatively high surface energy is included in the constitution of this invention, the wettability index as a substrate is preferably 40-60 mN/m.bb.

In this invention, it is advantageous to employ a long web of recording material, due to considerations of recording material cost, packaging expense, manufacturing cost, print operation efficiency and adaptability to a variety of sizes of printing media.

Next, a recording apparatus of this invention will be described.

In the following, the recording apparatus of this invention will be described, referring to appropriate drawings. Herein, the recording apparatus of the drawings is only an embodiment of this invention and the recording apparatus of this invention is not limited these drawings.

FIG. 1 is a front view drawing showing the primary portions of a recording apparatus of this invention. Recording apparatus 1 is equipped with head carriage 2, recording head 3, irradiation means 4 and platen portion 5. In recording apparatus 1, platen portion 5 is arranged under recording material P. Platen portion 5 functions to absorb UV rays and absorbs excess UV rays having passed through recording material P. As a result, a highly precise image can be very stably reproduced.

Recording material P is transported while guided by guiding member 6 from the front side to the interior of FIG. 1 by the movement of a transporting means (not shown in the drawing). Head scanning means (also not shown in the drawing) performs scanning of recording head 3 integrated with head carriage 2 by reciprocal motion of head carriage 2 in the Y direction of FIG. 1.

Arranged is head carriage 2 above recording material P, on which mounted are a plurality of recording head 3, corresponding to the number of colors utilized in image printing, by arranging the ejection outlets downward. Head carriage 2, driven by a head scanning means, is arranged to reciprocate along direction Y of FIG. 1 within the main body of recording apparatus 1, and transfers back and forth along the Y direction of FIG. 1.

Herein, FIG. 1 illustrates that head carriage 2 is structured of recording head 3 of white (W), yellow (Y), magenta (M), cyan (C), black (K) and white (W), however, the number of colors of recording head 3 stored in head carriage 2 is appropriately determined depending on actual cases.

Recording head 3 ejects active ray curable ink toward recording material P, which is supplied via an ink supplying means (not shown in the drawing), from an ejection outlet via a plural number of ejection nozzles (not shown in the drawing) arranged inside the recording head. Ultraviolet ray curable ink, ejected from recording head 3, is comprised of a colorant, a polymerizing monomer and an initiator, and is provided with the capability of being cured by a cross-linking and polymerization reaction of a monomer incorporating also the function of an initiator as a catalyst upon irradiation.

Recording head 3 ejects ultraviolet curable ink as drops on a predetermined locations of recording material P, and deposits ink drops onto said locations where designated, during driven scanning of the recording head along the Y direction of FIG. 1, from one edge to the other of recording material P.

After suitably performing the above scanning the required number while ejecting ultraviolet curable ink within the regions where deposition is intended, recording material P is appropriately transferred from the front side to the back direction of FIG. 1 via a transport means and ejection of ultraviolet curable ink by recording head 3 is performed within the next region where deposition is intended and adjacent, in the back direction of FIG. 1, to the above-described region where deposition is intended, while being scanned is repeated by the head scanning means.

An image, comprised of a pattern of ultraviolet curable ink drops is formed on recording material P by repeating the above operation while ejecting ultraviolet curable ink from recording head 3, synchronously with the head scanning means and the transfer means.

Irradiation means 4 is constituted of an ultraviolet lamp, which emits ultraviolet rays within a specific wavelength region at stable exposure energy, and a filter which transmits only ultraviolet rays of a specific wavelength. Herein, as an ultraviolet lamp, applicable are a mercury lamp, a metal halide lamp, an eximer laser, an ultraviolet laser, a cold cathode tube, a black light, and an LED (light emitting diode). A belt form metal halide lamp tube, a cold cathode tube, a mercury lamp tube or a black light is preferred. Specifically, a cold cathode tube and a black light which emit ultraviolet rays of 365 nm are preferred due to prevention of bleeding and efficient dot diameter control, as well as a decrease of wrinkling during curing. Irradiation means 4, used to cure ultraviolet ray curable ink, can be operated at low cost by utilizing a black light as a radiation source.

Irradiation means 4 is nearly the same dimension as the recording apparatus (being an ultraviolet ray curable type ink-jet printer) 1 or not smaller than the region where deposition is intended, within the region in which ultraviolet ray curable ink is ejected and deposited, by recording head 3 in one scanning by operation of the head scanning means.

Irradiation means 4 is arranged by being fixed on both ends of head carriage 2, nearly parallel to recording material P.

As a means to control illuminance at the ink ejection portion, as described above, most effective is naturally to shield entire recording head 3, in addition to this, effective is to make distance h2 between ink ejection portions 31 of recording head 3 and recording material P larger than distance h1 between irradiation means and recording material P (h1<h2), or to increase distance d between recording head 3 and irradiation means 4 (increasing d). Further, the space between recording head 3 and irradiation means 4 is more preferably covered by accordion structure 7.

Herein, the wavelength of ultraviolet rays of irradiation means 4 can be appropriately changed by changing the ultraviolet ray lamp or the filter, which are mounted in irradiation means 4.

Figure 2:
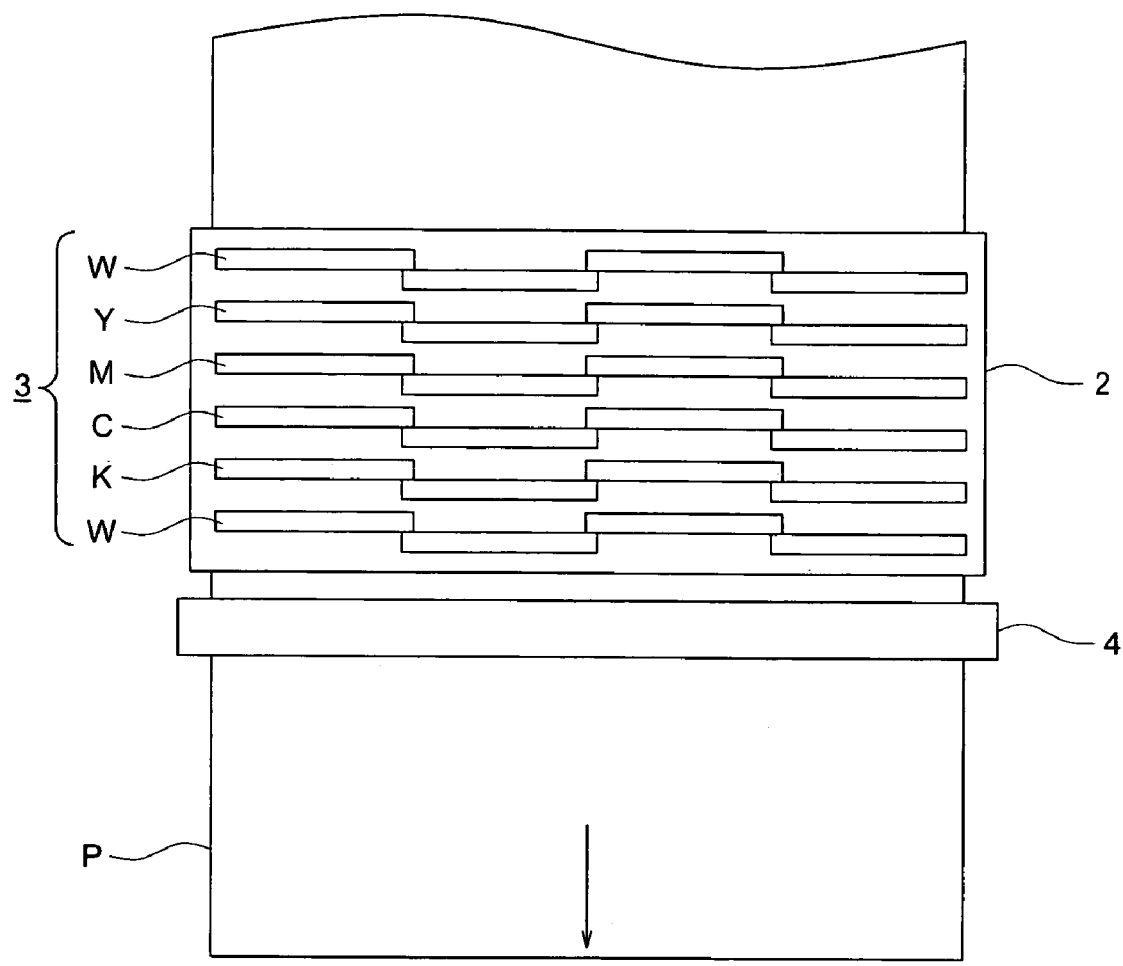
FIG. 2 is a drawing showing another example of the primary constitution of an inkjet recording apparatus.

FIG. 2 shows another example of the primary structure of an ink-jet recording apparatus.

The ink-jet recording apparatus in FIG. 2 is called a line head mode apparatus, in which a plural number of ink-jet recording heads 3 of each color is arranged and fixed on head carriage 2 to enable covering the entire width of recording material P. Head carriage 2 is shielded from light.

On the other hand, irradiation means 4, which is arranged so as to similarly treat the entire width of recording material P, and to cover the whole area of the ink printed sheet, is provided downstream of head carriage 2. As an ultraviolet lamp utilized in irradiation means 4, employed may be those similar to that described in FIG. 1.

In this line head mode, head carriage 2 and irradiation mean 4 are fixed and ink ejection and curing are performed while only recording material P is transported, resulting in image formation.

EXAMPLES

Example 1

Preparation of Curing Composition

A photopolymerization compound, a photopolymerization initiator, a compound of this invention and other additives were added and dissolved as shown in Table 1 to prepare photo-curable compositions.

Curing of Curable Composition

A coated layer was formed and cured using the following method. The obtained curable composition was coated on a synthetic paper sheet (Synthetic Paper Upo FGS, produced by Upo Corporation) to a layer thickness of 3 μm, followed within 1 second by irradiation with 800 mJ/cm$^2$ ultraviolet rays via a metal halide lamp, resulting in preparation of a cured product.

3) Evaluation of Flexibility: A curable composition was applied onto a synthetic paper sheet (Synthetic Paper Upo FGS produced by Upo Corporation) to a layer thickness of 30 μm, followed by irradiation within 1 second with 800 mJ/cm2 ultraviolet rays from a metal halide lamp to prepare a cured product. The obtained cured layer was evaluated based on the JIS K 5600 bending resistance test, the result of which are shown in Table 2.

TABLE 1

| Sample No. | Cationic polymerization compound 1 Type | *1 | Cationic polymerization compound 2 Type | *1 | Oxetane compound of this invention Type | *1 | Photo acid generating agent Type | *1 | Basic compound Type | *1 | Remarks |
|---|---|---|---|---|---|---|---|---|---|---|---|
| 1 | 2021P | 20 | OXT-221 | 70 | OX-1 | 10 | UVI-6992 | 5.0 | A | 0.5 | Invention |
| 2 | 2021P | 20 | OXT-221 | 70 | OX-2 | 10 | UVI-6992 | 5.0 | A | 0.5 | Invention |
| 3 | 2021P | 20 | OXT-221 | 70 | OX-8 | 10 | UVI-6992 | 5.0 | A | 0.5 | Invention |
| 4 | 2021P | 20 | OXT-221 | 70 | OX-9 | 10 | UVI-6992 | 5.0 | A | 0.5 | Invention |
| 5 | 2021P | 20 | OXT-221 | 70 | OX-23 | 10 | UVI-6992 | 5.0 | A | 0.5 | Invention |
| 6 | 2021P | 20 | OXT-221 | 70 | OX-30 | 10 | UVI-6992 | 5.0 | A | 0.5 | Invention |
| 7 | EP-18 | 30 | Vf7010 | 50 | OX-9 | 20 | SP-152 | 5.0 | B | 0.5 | Invention |
| 8 | EP-89 | 30 | Vf7010 | 50 | OX-30 | 20 | SP-152 | 5.0 | B | 0.5 | Invention |
| 9 | EP-18 | 40 | OXT-212 | 40 | OX-8 | 20 | PI-1 | 5.0 | A | 0.5 | Invention |
| 10 | EP-76 | 40 | OXT-212 | 40 | OX-8 | 20 | PI-1 | 5.0 | A | 0.5 | Invention |
| 11 | EP-89 | 40 | OXT-212 | 40 | OX-8 | 20 | PI-1 | 5.0 | A | 0.5 | Invention |
| 12 | EP-106 | 40 | OXT-212 | 40 | OX-8 | 20 | PI-1 | 5.0 | A | 0.5 | Invention |
| 13 | EP-18 | 30 | OXT-221 | 40 | OX-20 | 30 | PI-2 | 5.0 | A | 0.5 | Invention |
| 14 | EP-76 | 30 | OXT-221 | 40 | OX-20 | 30 | PI-2 | 5.0 | A | 0.5 | Invention |
| 15 | EP-89 | 30 | OXT-221 | 40 | OX-20 | 30 | PI-2 | 5.0 | B | 0.5 | Invention |
| 16 | EP-106 | 30 | OXT-221 | 40 | OX-20 | 30 | PI-2 | 5.0 | B | 0.5 | Invention |
| 17 | EP-18 | 20 | OXT-221 | 60 | OX-33 | 20 | PI-10 | 5.0 | B | 0.5 | Invention |
| 18 | EP-76 | 20 | OXT-221 | 60 | OX-33 | 20 | PI-10 | 5.0 | B | 0.5 | Invention |
| 19 | EP-89 | 20 | OXT-221 | 60 | OX-33 | 20 | PI-10 | 5.0 | B | 0.5 | Invention |
| 20 | EP-106 | 20 | OXT-221 | 60 | OX-33 | 20 | PI-10 | 5.0 | B | 0.5 | Invention |
| Comp. 101 | 2021P | 30 | OXT-221 | 70 | | | UVI-6992 | 5.0 | A | 0.5 | Comparison |
| Comp. 102 | EP-89 | 20 | OXT-221 | 80 | | | UVI-6992 | 5.0 | A | 0.5 | Comparison |
| Comp. 103 | Oxetane A | 20 | OXT-221 | 80 | | | UVI-6992 | 5.0 | A | 0.5 | Comparison |
| Comp. 104 | Oxetane A | 30 | OXT-221 | 70 | | | UVI-6992 | 5.0 | A | 0.5 | Comparison |
| Comp. 105 | | | OXT-221 | 70 | OX-1 | 30 | UVI-6992 | 5.0 | A | 0.5 | Comparison |
| Comp. 106 | | | OXT-221 | 70 | OX-8 | 30 | UVI-6992 | 5.0 | A | 0.5 | Comparison |

*1; Addition amount (weight parts)

Evaluation Method of Cured Product

The physical properties of the obtained cured product were evaluated by the tests shown in the following paragraphs.

1) Pencil Scratch Test: The hardness of each cured product was measured via named "Mitsubishi Uni" pencils with a load of 1,000 g, based on JIS K 5400.

That is, the hardness of a cured layer was tested by a test method employing a pencil scratch tester based on JIS K 5401. The load was 1,000 g and a Mitsubishi Uni pencil was utilized. The evaluation was based on frictional drag on a coated layer. When using two pencils having adjacent density marks, and one group exhibits frictional drags at scratching of at least twice and the other exhibits less than twice, the density mark of a pencil which exhibits frictional drags at scratching of less than twice was designated as a pencil scratch value.

2) Residual Grid Adhesion Ratio Test by Tape Peeling: After adhesive tape was applied onto the cured composition sample in a grid test based on JIS K 5400, followed by being pressed by a single back and forth pass with a 2 kg roller, the tape was quickly peeled off, and the residual number of grid samples was counted.

Compounds used above are shown below.

Celloxide 2021P: produced by Daicel Chemical Industries Ltd.

Oxetane A: 2-(4-methoxy-phenyl)-3,3-dimethyl-oxetane

OXT-221: produced by Toagosei Co. Ltd.

OXT-212: produced by Toagosei Co., Ltd.

Vf7010: Vikoflex 71010 (produced by Atofina Corp.)

UVI-6992: produces by Dow Chemicals Co., Ltd., at a 50% solution of propione carbonate SP-152: Adekaoptomer SP-152, produced by Asahi Denka Co., Ltd.

Basic compound A: N-ethyldiethanolamine

Basic compound B: triisopropanlamine

TABLE 2

| Sample No. | Pencil scratch value (pencil hardness) | Adhesion residual ratio (%) | Bending resistance φ: mm | Remarks |
|---|---|---|---|---|
| 1 | 3H | 85 | 3 mm φ | Invention |
| 2 | 2H | 85 | 2 mm φ | Invention |
| 3 | 2H | 85 | 1 mm φ | Invention |
| 4 | 2H | 80 | No cracks even at 1 mm φ | Invention |

TABLE 2-continued

| Sample No. | Pencil scratch value (pencil hardness) | Adhesion residual ratio (%) | Bending resistance φ: mm | Remarks |
|---|---|---|---|---|
| 5 | 2H | 75 | No cracks even at 1 mm φ | Invention |
| 6 | 2H | 75 | No cracks even at 1 mm φ | Invention |
| 7 | 2H | 75 | No cracks even at 1 mm φ | Invention |
| 8 | 2H | 75 | No cracks even at 1 mm φ | Invention |
| 9 | 3H | 80 | 1 mm φ | Invention |
| 10 | 3H | 80 | 1 mm φ | Invention |
| 11 | 3H | 80 | 1 mm φ | Invention |
| 12 | 3H | 80 | 1 mm φ | Invention |
| 13 | 3H | 80 | No cracks even at 1 mm φ | Invention |
| 14 | 3H | 80 | No cracks even at 1 mm φ | Invention |
| 15 | 3H | 80 | No cracks even at 1 mm φ | Invention |
| 16 | 3H | 80 | No cracks even at 1 mm φ | Invention |
| 17 | 2H | 85 | 1 mm φ | Invention |
| 18 | 2H | 85 | 1 mm φ | Invention |
| 19 | 2H | 85 | 1 mm φ | Invention |
| 20 | 2H | 85 | 1 mm φ | Invention |
| Comparison 101 | 2H | 50 | Cracks generated even at 10 mm φ | Comparison |
| Comparison 102 | 3H | 40 | Cracks generated even at 10 mm φ | Comparison |
| Comparison 103 | 2H | 85 | 8 mm φ | comparison |
| Comparison 104 | 2H | 85 | 7 mm φ | Comparison |
| Comparison 105 | HB | 70 | 3 mm φ | comparison |
| Comparison 106 | HB | 70 | 3 mm φ | Comparison |

As is apparent from Table 2 that samples of this invention exhibit little deterioration of layer hardness as well as improved adhesion and flexibility.

Example 2

Ink Composition Dispersant (PB822, manufactured by Ajinomoto FineTechno Co., Ltd.) of 5 weight parts and each photopolymerization compound described in Table 3 were charged into a stainless steel beaker and dissolved by stirring and mixing for 1 hour, while heated on a 65° C. hot plate. Next, after 3 weight parts of each pigment was added into this solution, the solution was charged into a plastic bottle together with 200 g of 1 mm zirconia beads, sealed and subjected to a dispersion treatment using a paint shaker for 2 hours. Next, the zirconia beads were removed, and various types of additives such as each photopolymerization initiator, a basic compound and a surface active agent were added in the combinations shown in Table 3, after which the resulting solution was filtered via a 0.8 μm membrane filter to minimize printer clogging, resulting in preparation of an ink composition set.

Utilized pigments are as follows:
K: C. I. Pigment Black 7
C: C. I. Pigment Blue 15:3
M: C. I. Pigment Red 57:1
Y: C. I. Pigment Yellow 13
W: Titanium oxide (anatase type: at a particle diameter of 0.2 μm)
Lk: C. I. Pigment Black 7
Lc: C. I. Pigment Blue 15:3
Lm: C. I. Pigment Red 57:1
Ly: C.I. Pigment Yellow 13

Ink-jet Image Forming Method

Each curing composition ink prepared above was charged into an ink-jet recording apparatus, which was equipped with piezo-type ink-jet nozzles and comprised the structure of FIG. 1, after which the following image recording was continuously performed on various recording materials in the form of a long roll at a 600 mm width and a 20 m length. The ink supply system was structured of an ink tank, supply piping, a pre-chamber ink tank immediately before the head, piping equipped with a filter and a piezo head, and the portion from the pre-chamber ink tank to the head was insulated and heated at 50° C. Herein, the head portion was heated considering the viscosity of each curable composition ink, and said ink was continuously ejected from the head to eject multi-size dots at a liquid drop volume of 2-15 pl for a resolution of 720×720 dpi (dpi represents the number of dots per 1 linear inch, or per linear 2.54 cm). Further, the recording material was heated at 50° C. by a plane heater. After deposition, the ink was cured almost instantaneously (less than 0.5 second after deposition) by irradiation light source A: being a High Pressure Mercury Lamp VZero085 (manufactured by Integration Technology Corp.) or irradiation light source B: Metal Halide Lamp (MAL400NL, manufactured by Nippon Denchi Co., Ltd., at electrical consamption of 3 kW·hr and 120 W/cm). The total ink layer thickness was measured after image recording and found to be in the range of 2.3-13 μn. Herein, as for formation of ink-jet images, printing was performed according to the above-described method in the range of 30° C.·80% RH and 25° C.·20% RH.

Herein, the illuminance of each irradiation light source was measured as an integrated illuminance at 254 nm via UVPF-A1 manufactured by Iwasaki Electric Co., Ltd.

Further, the detail of measuring and full spelling of each abbreviation of each recording material is as follows.

Synthetic Paper: Upo FGS, produced by Upo Corporation
PVC: Polyvinyl chloride

Measurement of Viscosity: Viscosity was measured at 25° C. and with a shearing velocity of 1,000 l/s.

Evaluation of Ejection Capability

After ink was continuously ejected for 30 minutes, the state of ink deficiency was visually observed, and rated as follows.

A: No deficiency was noted, which is an excellent level.
B: Slight deficiency was noted, but was not a problem.
C: Some deficiency was noted, and which affected the image quality.
D: Significant deficiency was noted, which resulted in non-viable images.

Evaluation of Ink-jet Recorded Images

With respect to each image recorded via the image recording method described above, each of the following evaluations was performed. MS ming characters of 6 point size were printed for a targeted density, and roughness of the character was evaluated via a magnifying glass to judge the character quality based on the following criteria.

A: No roughness was observed.

B: Slight roughness was observed.

C: Some roughness was observed, characters are distinguishable, however, at a barely viable level.

D: Significant roughness was observed and characters are blurred, being at a non-viable level.

Color Contamination (Bleeding, Wrinkling)

Printing at 720 dpi was performed so that dots of each Y, M, C and K color were arranged adjacent to each other, after which adjacent dots were magnified via a loupe to visually observe the state of bleeding and wrinkling, resulting in evaluation of color contamination based on the following criteria.

A: The shape of adjacent dots was a true circle and no bleeding are observed.

B: The shape of adjacent dots was a nearly true circle and little bleeding is observed.

C: Adjacent dots exhibited some bleeding and the dot shape was slightly deformed, resulting in a barely viable level.

D: Adjacent dots exhibited bleeding and were mixed with each other, in addition wrinkling was observed at the overlapped portions, resulting in an unviable rating.

Evaluation of Hardness and Bending Resistance of Cured Layers

The physical properties of a cured layer, prepared by printing according to the ink-jet image forming method described above utilizing cyan ink in which cyan pigment is dispersed, were evaluated for the following tests.

1) Pencil Scratch Test: The hardness of each cured product was measured based on JIS K 5400.

2) Evaluation of Flexibility: A curable composition was ejected on synthetic paper (Upo FGS, produced by Upo Corporation) to result in a layer thickness of 30 μm, follow by irradiation of 800 mJ/cm² ultraviolet rays from a metal halide lamp within 1 second to prepare a cured layer. The obtained cued layers were evaluated based on the flexibility evaluation method of JIS K 5600, the result of which are shown in Table 4.

TABLE 3

| Sample No. | Cationic polymerization compound 1 Type | *1 | Cationic polymerization compound 2 Type | *1 | Oxetane compound of this invention Type | *1 | Photo acid generating agent Type | *1 | Basic comp. (Add. amount 0.5 weight parts) Type | Surfactant (Add. amount 0.5 weight parts) Type | Compatibility promoting agent (Add. amount 0.5 weight parts) Type | Remark |
|---|---|---|---|---|---|---|---|---|---|---|---|---|
| 31 | 2021P | 20 | OXT-221 | 70 | OX-1 | 10 | UVI-6992 | 5.0 | A | F1405 | 145P | Inv. |
| 32 | 2021P | 20 | OXT-221 | 70 | OX-2 | 10 | UVI-6992 | 5.0 | A | F1405 | 145P | Inv. |
| 33 | 2021P | 20 | OXT-221 | 70 | OX-8 | 10 | UVI-6992 | 5.0 | A | F1405 | 145P | Inv. |
| 34 | 2021P | 20 | OXT-221 | 70 | OX-9 | 10 | UVI-6992 | 5.0 | A | F1405 | 145P | Inv. |
| 35 | 2021P | 20 | OXT-221 | 70 | OX-23 | 10 | UVI-6992 | 5.0 | A | F1405 | 145P | Inv. |
| 36 | 2021P | 20 | OXT-221 | 70 | OX-30 | 10 | UVI-6992 | 5.0 | A | F1405 | 145P | Inv. |
| 37 | EP-18 | 30 | Vf7010 | 50 | OX-9 | 20 | SP-152 | 5.0 | B | F1405 | 145P | Inv. |
| 38 | EP-89 | 30 | Vf7010 | 50 | OX-30 | 20 | SP-152 | 5.0 | B | F1405 | 145P | Inv. |
| 39 | EP-18 | 40 | OXT-212 | 40 | OX-8 | 20 | PI-1 | 5.0 | A | F1405 | 145P | Inv. |
| 40 | EP-76 | 40 | OXT-212 | 40 | OX-8 | 20 | PI-1 | 5.0 | A | F1405 | 145P | Inv. |
| 41 | EP-89 | 40 | OXT-212 | 40 | OX-8 | 20 | PI-1 | 5.0 | A | F1405 | 145P | Inv. |
| 42 | EP-106 | 40 | OXT-212 | 40 | OX-8 | 20 | PI-1 | 5.0 | A | F1405 | 145P | Inv. |
| 43 | EP-18 | 30 | OXT-221 | 40 | OX-20 | 30 | PI-2 | 5.0 | A | F178K | R100 | Inv. |
| 44 | EP-76 | 30 | OXT-221 | 40 | OX-20 | 30 | PI-2 | 5.0 | A | F178K | R100 | Inv. |
| 45 | EP-89 | 30 | OXT-221 | 40 | OX-20 | 30 | PI-2 | 5.0 | B | F178K | R100 | Inv. |
| 46 | EP-106 | 30 | OXT-221 | 40 | OX-20 | 30 | PI-2 | 5.0 | B | F178K | R100 | Inv. |
| 47 | EP-18 | 20 | OXT-221 | 60 | OX-33 | 20 | PI-10 | 5.0 | B | F178K | R100 | Inv. |
| 48 | EP-76 | 20 | OXT-221 | 60 | OX-33 | 20 | PI-10 | 5.0 | B | F178K | R100 | Inv. |
| 49 | EP-89 | 20 | OXT-221 | 60 | OX-33 | 20 | PI-10 | 5.0 | B | F178K | R100 | Inv. |
| 50 | EP-106 | 20 | OXT-221 | 60 | OX-33 | 20 | PI-10 | 5.0 | B | F178K | R100 | Inv. |
| Comp. 111 | 2021P | 30 | OXT-221 | 70 | | | UVI-6992 | 5.0 | A | F178K | R100 | Comp. |
| Comp. 112 | EP-89 | 20 | OXT-221 | 80 | | | UVI-6992 | 5.0 | A | F178K | R100 | Comp. |
| Comp. 113 | Oxetane A | 20 | OXT-221 | 80 | | | UVI-6992 | 5.0 | A | F178K | R100 | Comp. |
| Comp. 114 | Oxetane A | 30 | OXT-221 | 70 | | | UVI-6992 | 5.0 | A | F178K | R100 | Comp. |
| Comp. 115 | | | OXT-221 | 70 | OX-1 | 30 | UVI-6992 | 5.0 | A | F178K | R100 | Comp. |
| Comp. 116 | | | OXT-221 | 70 | OX-8 | 30 | UVI-6992 | 5.0 | A | F178K | R100 | Comp. |

*1: Addition amount (weight parts)

Inv.: Invention

Comp.: Comparison

Utilized compounds are shown below.

F1405: Megafax F1405

145P: Haritac 145P (rosin modified maleic acid resin, manufactured by Harima Chemicals Co., Ltd.)

R100: Haritac R100 (rosin modified maleic acid resin, manufactured by Harima Chemicals Co., Ltd.)

TABLE 4

| Sample No. | 30° C. · 80% RH PVC *1 | *2 | Upo FGS *1 | *2 | 25° C. · 20% RH PVS *1 | *2 | Upo FGS *1 | *2 | Hardness of cured layer | Bending resistance φ: mm | Ink ejection capability | Ink viscosity mPa·s (25° C.) |
|---|---|---|---|---|---|---|---|---|---|---|---|---|
| 31 | A | B | A | B | A | B | A | B | 3H | 3 mm φ | A | 18 |
| 32 | A | B | A | B | A | B | A | B | 2H | 2 mm φ | A | 18 |
| 33 | A | B | A | B | A | B | A | B | 2H | 1 mm φ | A | 19 |
| 34 | A | B | A | B | A | B | A | B | 2H | No cracks even at 1 mm φ | A | 19 |
| 35 | A | B | A | B | A | B | A | B | 2H | No crack even at 1s mm φ | A | 20 |
| 36 | A | B | A | B | A | B | A | B | 2H | No cracks even at 1 mm φ | A | 20 |
| 37 | A | B | A | B | A | B | A | B | 2H | No cracks even at 1 mm φ | A | 22 |
| 38 | A | B | A | B | A | B | A | B | 2H | No cracks even at 1 mm φ | A | 22 |
| 39 | A | A | A | B | A | A | A | A | 3H | 1 mm φ | A | 23 |
| 40 | A | A | A | B | A | A | A | A | 3H | 1 mm φ | A | 22 |
| 41 | A | A | A | B | A | A | A | A | 3H | 1 mm φ | A | 25 |
| 42 | A | A | A | B | A | A | A | A | 3H | 1 mm φ | A | 22 |
| 43 | A | B | A | B | A | A | A | A | 3H | No cracks even at 1 mm φ | A | 17 |
| 44 | A | B | A | B | A | A | A | A | 3H | No cracks even at 1 mm φ | A | 17 |
| 45 | A | B | A | B | A | A | A | A | 3H | No cracks even at 1 mm φ | A | 18 |
| 46 | A | B | A | B | A | A | A | A | 3H | No cracks even at 1 mm φ | A | 16 |
| 47 | B | B | B | B | A | B | A | B | 2H | 1 mm φ | A | 18 |
| 48 | B | B | B | B | A | B | A | B | 2H | 1 mm φ | A | 17 |
| 49 | B | B | B | B | A | B | A | B | 2H | 1 mm φ | A | 19 |
| 50 | B | B | B | B | A | B | A | B | 2H | 1 mm φ | A | 18 |
| Comp. 111 | C | D | C | D | C | C | C | C | 2H | Cracks generated even at 10 mm φ | C | 22 |
| Comp. 112 | C | D | C | D | C | C | C | C | 3H | Cracks generated even at 10 mm φ | C | 20 |
| Comp. 113 | C | D | C | D | C | C | C | C | 2H | 8 mm φ | B | 16 |
| Comp. 114 | C | D | C | D | C | C | C | C | 2H | 7 mm φ | B | 18 |
| Comp. 115 | C | D | C | D | C | D | C | D | HB | 3 mm φ | B | 17 |
| Comp. 116 | C | D | C | D | C | D | C | D | HB | 3 mm φ | B | 18 |

*1: Character
*2: Bleeding

As is apparent form Table 4, samples of this invention are excellent in ejection capability as well as improved in image quality. Samples of this invention exhibit an excellent curing capability regardless of differing conditions.

What is claimed is:

1. An active ray curable ink comprising at least two photo-polymerization compounds, one of which is a compound represented by Formula (A) and the other is an epoxy compound, having an oxirane ring in the molecule:

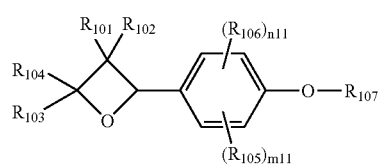

Formula (A)

wherein $R_{101}$, $R_{102}$, $R_{103}$, $R_{104}$, $R_{105}$ and $R_{106}$ each are a substituent, m11 and n11 each are an integer of 0 or 1, $R_{107}$ is a substituted or unsubstituted alkyl group having carbon atoms of not less than 4, provided that the alkyl group may be either a straight chain alkyl group, a branched alkyl group or a cyclic alkyl group.

2. The active ray curable ink of claim 1, wherein the epoxy compound is represented by Formula (B):

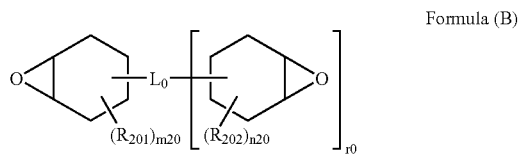

Formula (B)

wherein $R_{201}$ and $R_{202}$ each are a substituent, m20 and n20 each are an integer of 0 to 2, r0 is an integer of 1 to 3, $L_0$ is a single bong or a linking group having 1-15 carbon atoms and a valency of r0+1, provided that $L_0$ may contain an oxygen atom or a sulfur atom in the main chain.

3. The active ray curable ink of claim 1, further comprising a compound having an oxetane ring without substituent at 2-position of the oxetane ring.

4. The active ray curable ink of claim 1, wherein $R_{107}$ of Formula (A) is a substituted or unsubstituted alkyl group having carbon atoms of not less than 7.

5. The active ray curable ink of claim 1, wherein $R_{107}$ of Formula (A) is an alkyl group substituted by an alkoxy group.

6. The active ray curable ink of claim 1, wherein an epoxy compound is represented by Formula (I) or (II):

Formula (I)

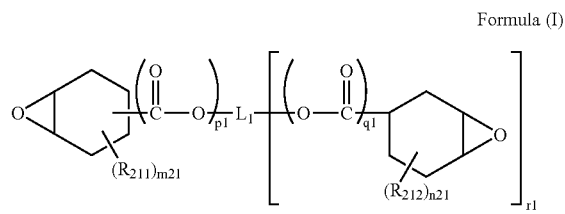

wherein $R_{211}$ and $R_{212}$ each are a substituent, m21 and n21 each are an integer of 0 to 2, p1 and q1 each are an integer of 0 or 1, r1 is an integer of 1 to 3, and $L_1$ is a single bond or a linking group having 1 to 15 carbon atoms and a valency of r1+1, provided that $L_1$ may contain an oxygen atom or a sulfur atom in the main chain;

Formula (II)

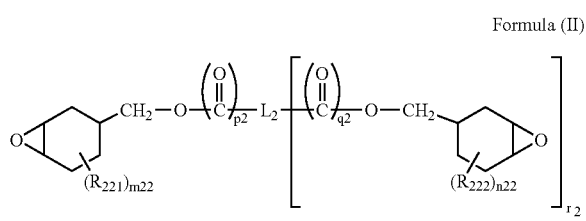

wherein $R_{221}$ and $R_{222}$ each are a substituent, m22 and n22 each are an integer of 0 to 2, p2 and q2 each are an integer of 0 or 1, r2 is an integer of 1 to 3, and $L_2$ is a single bond or a linking group having 1 to 15 carbon atoms and a valency of r2+1, and provided that $L_2$ may contain an oxygen atom or a sulfur atom in the main chain.

7. The active ray curable ink of claim 1, wherein an epoxy compound is represented by Formula (III) or (IV):

Formula (III)

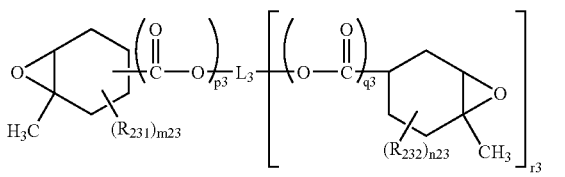

wherein $R_{231}$ and $R_{232}$ each are a substituent, m23 and n23 each are an integer of 0 or 1, p3 and q3 each are an integer of 0 or 1, r3 is an integer of 1 to 3, and $L_3$ is a single bond or a linking group having 1 to 15 carbon atoms and a valency of r3+1, provided that $L_3$ may contain an oxygen atom or a sulfur atom in the main chain;

Formula (IV)

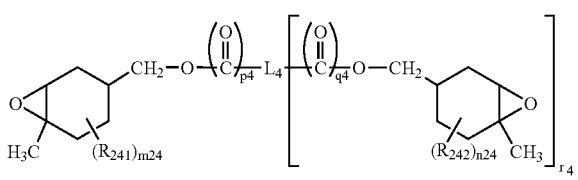

wherein $R_{241}$ and $R_{242}$ each are a substituent, m24 and n24 each are an integer of 0 or 1, p4 and q4 each are an integer of 0 or 1, r4 is an integer of 1 to 3, and $L_4$ is a single bond or a linking group having 1 to 15 carbon atoms and a valency of r4+1, provided that $L_4$ may contain an oxygen atom or a sulfur atom in the main chain.

8. The active ray curable ink of claim 3, wherein the compound having the oxetane ring is a poly-functional oxetane compound having at least two oxetane rings in the molecule.

9. The active ray curable ink of claim 1, further comprising a compound which generates an acid by irradiation with active rays.

10. The active ray curable ink of claim 9, wherein a compound which generates an acid by irradiation with active rays is an onium salt compound.

11. The active ray curable ink of claim 9, wherein a compound which generates an acid by irradiation with active rays is a sulfonium salt compound.

12. The active ray curable ink of claim 9, wherein a compound which generates an acid by irradiation with active rays is a sulfonium salt compound represented by Formula (I-1), (I-2) or (I-3):

Formula (I-1)

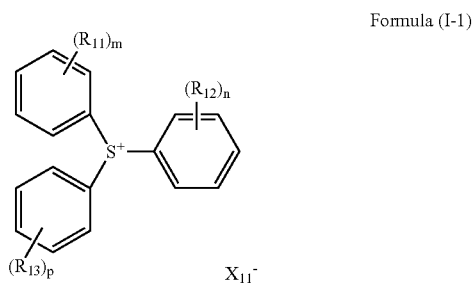

wherein $R_{11}$, $R_{12}$ and $R_{13}$ each are a substituent, m, n and p each are an integer of 0 to 2, and $X_{11}^-$ is a counter ion;

Formula (I-2)

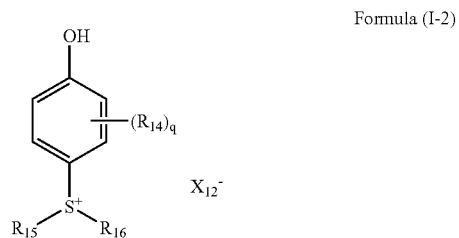

wherein $R_{14}$ is a substituent, q is an integer of 0 to 2, $R_{15}$ and $R_{16}$ each are a substituted or unsubstituted alkyl group, a substituted or unsubstituted alkenyl group, a substituted or unsubstituted alkynyl group, or a substituted or unsubstituted aryl group, and $X_{12}^-$ is a counter ion;

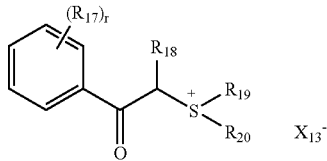

Formula (I-3)

wherein $R_{17}$ is a substituent, r is an integer of 0 to 3, $R_{18}$ is a hydrogen atom or a substituted or unsubstituted alkyl group, $R_{19}$ and $R_{20}$ each are a substituted or unsubstituted alkyl group, a substituted or unsubstituted alkenyl group, a substituted or unsubstituted alkynyl group or a substituted or unsubstituted aryl group, and $X_{13}^-$ is a counter ion.

13. The active ray curable ink of claims 1, wherein the ink has a viscosity of 7 to 40 mPa·s at 25° C.

14. The active ray curable ink of claim 1, wherein the ink contains a pigment.

15. An image forming method comprising the step of:
ejecting droplets of the active ray curable ink of claim 1 according to image data from a plurality of nozzles of an ink-jet recording head on a recording material, wherein a volume of the droplets is from 2 to 15 pl.

16. An ink-jet receding apparatus which is utilized for the image forming method claim 15, wherein the ink and the recording head are heated 35 to 100° C. prior to ejecting droplets of the ink.

17. The ink-jet recording apparatus which is utilized for the image forming method if claim 15, wherein the ink is ejected on the recoding material which is heated at 35 to 60° C.

* * * * *